US012440308B2

(12) United States Patent
Bercovici et al.

(10) Patent No.: US 12,440,308 B2
(45) Date of Patent: Oct. 14, 2025

(54) RESTORING A 3D DIGITAL DEFECTIVE TOOTH MODEL

(71) Applicant: EXOCAD GMBH, Darmstadt (DE)

(72) Inventors: Adrian Bercovici, Darmstadt (DE); Iurie Chiosa, Darmstadt (DE)

(73) Assignee: EXOCAD GMBH, Darmstadt (DE)

( * ) Notice: Subject to any disclaimer, the term of this patent is extended or adjusted under 35 U.S.C. 154(b) by 716 days.

(21) Appl. No.: 17/668,986

(22) Filed: Feb. 10, 2022

(65) Prior Publication Data
US 2023/0248473 A1  Aug. 10, 2023

(51) Int. Cl.
*A61C 7/00* (2006.01)
*A61C 13/00* (2006.01)
*B33Y 10/00* (2015.01)
*B33Y 80/00* (2015.01)

(52) U.S. Cl.
CPC .......... *A61C 7/002* (2013.01); *A61C 13/0004* (2013.01); *B33Y 10/00* (2014.12); *B33Y 80/00* (2014.12); *G06T 2207/30036* (2013.01)

(58) Field of Classification Search
CPC ..... A61C 7/002; A61C 13/0004; A61C 13/20; B33Y 10/00; B33Y 80/00; B33Y 30/00; G06T 2207/30036
See application file for complete search history.

(56) References Cited

U.S. PATENT DOCUMENTS

| | | | |
|---|---|---|---|
| 2005/0043837 A1* | 2/2005 | Rubbert | A61C 7/00 700/118 |
| 2017/0027671 A1* | 2/2017 | Kim | G06V 20/64 |
| 2018/0028294 A1 | 2/2018 | Azernikov et al. | |
| 2022/0008175 A1 | 1/2022 | Ojelund et al. | |
| 2022/0151733 A1* | 5/2022 | Liu | A61C 13/0004 |
| 2023/0277283 A1* | 9/2023 | Piche | A61C 5/70 433/223 |

FOREIGN PATENT DOCUMENTS

| | | |
|---|---|---|
| WO | WO-2021262336 A1 | 12/2021 |
| WO | WO-2022016294 A1 | 1/2022 |

* cited by examiner

*Primary Examiner* — Charles Cai
(74) *Attorney, Agent, or Firm* — PERRY + CURRIER INC.

(57) ABSTRACT

The invention relates to a computer-implemented method for restoring a 3D digital defective tooth model of a tooth of a patient. The 3D digital defective tooth model is missing one or more tooth sections. The method comprises receiving a 3D digital teeth model of at least a part of a dentition of a patient comprising the 3D digital defective tooth model. A 3D digital supplemented tooth model of the tooth of the patient is generated. The generating of the 3D digital supplemented tooth model comprises supplementing the 3D digital defective tooth model with one or more filling tooth sections used to fill one or more of the missing tooth sections.

38 Claims, 13 Drawing Sheets

RESTORING A 3D DIGITAL DEFECTIVE TOOTH MODEL

The invention relates to the field of dental technology. More particularly, the invention relates to a computer-implemented method for restoring a 3D digital defective tooth model of a tooth of a patient. The invention furthermore relates to a computer device and a computer program product for restoring a 3D digital defective tooth model of a tooth of a patient as well as to a manufacturing system comprising the computer device.

Computer-implemented methods, like CAD/CAM methods, are gaining more and more relevance in the field of dental technology. In this context, 3D digital tooth models are used for different purposes. Such 3D digital tooth models may, e.g., be generated using scan data of a scan of a patient's tooth. However, 3D digital tooth models may comprise defects requiring corrections. Such defects may, e.g., be defects of the patient's tooth, which is resembled by the 3D digital tooth model, or the defects may, e.g., be caused during generation of the 3D digital model. For example, scan data used for generating the 3D digital tooth model may comprise defects, e.g., due to a complete or erroneous scan. Resolving such defects may be challenging.

It is an objective to provide for a computer-implemented method, a computer device and computer program product for restoring a 3D digital defective tooth model of a tooth of a patient. Furthermore, it is an objective to provide for a manufacturing system for manufacturing a dental restoration element.

In one aspect, the invention relates to a computer-implemented method for restoring a 3D digital defective tooth model of a tooth of a patient. The 3D digital defective tooth model is missing one or more tooth sections. The method comprises receiving a 3D digital teeth model of at least a part of a dentition of a patient. The 3D digital teeth model comprises at least the 3D digital defective tooth model. A 3D digital supplemented tooth model of the tooth of the patient is generated. The generating of the 3D digital supplemented tooth model comprises supplementing the 3D digital defective tooth model with one or more filling tooth sections used to fill one or more of the missing tooth sections.

At least one of the one or more filling tooth sections used to supplement the 3D digital defective tooth model is provided using a 3D digital artificial tooth model of an artificial tooth. The supplementing of the filling tooth sections further comprises providing the 3D digital artificial tooth model. The 3D digital defective tooth model is overlaid with the 3D digital artificial tooth model. The 3D digital defective tooth model is merged with the 3D digital artificial tooth model by adding at least one tooth section of the 3D digital artificial tooth model missing in the 3D digital defective tooth model as the respective at least one filling tooth section to the 3D digital defective tooth model for generating the 3D digital supplemented tooth model.

Examples may have the beneficial effect, that an efficient and effective approach to resolve defects of a 3D digital defective tooth model in form of missing tooth sections is provided. By supplementing the 3D digital defective tooth model, a surface, i.e., the surface of the 3D digital supplemented tooth model, may be defined without missing sections. The surface being defined may be a restored surface of the tooth of the patient provided by the 3D digital supplemented tooth model resembling a 3D digital restored model of the respective tooth. The defect is resolved by filling the missing tooth sections with one or more filling tooth sections. A 3D digital supplemented tooth model of the tooth of the patient may be provided and, e.g., be used as a 3D digital restored model of the respective tooth. The filling with the filling tooth sections may be used for a digital restoration of the tooth. A resulting surface of the restored tooth defined by the 3D digital supplemented tooth model may define a restored surface of the tooth of the patient. In case the missing tooth sections are actual physical tooth section, which are missing, the 3D digital restored model resembles a restoration of the physically damaged tooth. In this case, the 3D digital restored model, i.e., the 3D digital supplemented tooth model, may define a target state for a restoration of the physically damaged tooth to be achieved. In case the missing tooth sections are caused during generation of the 3D digital defective tooth model, e.g., by incomplete scan data, the 3D digital restored model resembles a restoration of the 3D digital defective tooth model. In this case, the 3D digital restored model, i.e., the 3D digital supplemented tooth model, may be a digital copy of a current state of the physical tooth, for which digital defects have been corrected.

Examples may further have the beneficial effect, that using a 3D digital artificial tooth model for supplementing the 3D digital defective tooth model provides an effective and efficient method for generating and adding filling tooth sections in order to provide the 3D digital supplemented tooth model.

The method comprises receiving a 3D digital teeth model of at least a part of a dentition of a patient. The 3D digital teeth model comprises at least the 3D digital defective tooth model. The 3D digital teeth model may, e.g., comprise further 3D digital models of one or more further teeth of the patient, e.g., of one or two dental arches. The 3D digital defective tooth model may, e.g., be segmented, i.e., extracted from the 3D digital teeth model for being supplemented with filling tooth sections. The 3D digital teeth model may, e.g., only comprise the 3D digital defective tooth model. The 3D digital defective tooth model is a 3D digital model of a tooth of the patient comprising defects in form of missing tooth sections. These defects may, e.g., be caused by defects of the tooth of the patient. For example, the respective tooth may be missing tooth section. Alternatively or additionally, the defect may, e.g., be caused when generating the 3D digital defective tooth model, i.e., when transferring the physical tooth to a 3D digital representation. For example, acquired scan data of the tooth may be incomplete resulting in a 3D digital defective tooth model missing one or more tooth sections. The incompletion of the scan data may, e.g., be caused by an incomplete and/or erroneous scan. Furthermore, a tooth section may, e.g., be missing in case it had to be removed. A tooth section may, e.g., have to be removed in case of errors, e.g., due to artifacts comprised by the respective section.

The 3D digital defective tooth model is supplemented with one or more filling tooth sections. These filling tooth sections are used to fill the one or more of the missing tooth sections. Filling the missing tooth sections results in the 3D digital supplemented tooth model. The 3D digital supplemented tooth model may correspond to a 3D digital model of the tooth under consideration without defects, i.e., without missing tooth sections.

At least one of the one or more filling tooth sections used to supplement the 3D digital defective tooth model is provided using a 3D digital artificial tooth model of an artificial tooth. Thus, the respective filling tooth sections do not have to be constructed from scratch. For example, all of the one or more filling tooth sections used to supplement the 3D digital defective tooth model are provided using a 3D digital artificial tooth model of an artificial tooth. The supplementing of the filling tooth sections further comprises providing the 3D digital artificial tooth model. The 3D digital defective tooth model is overlaid with the 3D digital artificial tooth model. The 3D digital defective tooth model is merged with the 3D digital artificial tooth model by adding at least one tooth section of the 3D digital artificial tooth model missing in the 3D digital defective tooth model as the respective at least one filling tooth section to the 3D digital defective tooth model for generating the 3D digital supplemented tooth model. For merging the 3D digital artificial tooth model with the 3D digital defective tooth model, the 3D digital artificial tooth model may in addition be adjusted, in order to ensure a precise fitting of the filling tooth sections into the missing tooth sections of the 3D digital defective tooth model. For example, each of the filling tooth sections is added to the 3D digital defective tooth model in form of a tooth section of the 3D digital artificial tooth model missing in the 3D digital defective tooth model.

The 3D digital teeth model with the 3D digital defective tooth model may be generated using scan data of the patient's oral cavity. For example, the patient's teeth in the oral cavity may be scanned using an intraoral scanner, e.g., an optical intraoral scanner. The scan may comprise at least a part of the dentition of the patient, which comprises the respective tooth. For example, the upper and/or lower jaw, i.e., the mandibular dental arch and/or maxillary dental arch, are scanned. The achieved scan data may be used to provide the 3D digital teeth model of the scanned teeth of the oral cavity. Alternatively, an impression of the patient's teeth in the oral cavity, i.e., a negative imprint of the teeth may be taken. Either this impression may be scanned, e.g., using an optical scanner, or the negative imprint provided by the impression may be used to generate a positive reproduction of the patient's teeth, i.e., a 3D physical teeth model or cast, which is scanned, e.g., by the optical scanner to provide the scan data used to generate the 3D digital teeth model.

The defect of the 3D digital defective tooth model, i.e., the missing one or more tooth sections, may be caused by the tooth being scanned. For example, the tooth being scanned may miss these sections, i.e., be a defective tooth. Consequently, the 3D digital defective tooth model may miss the respective sections as well. Alternatively or additionally, the defect of the 3D digital defective tooth model may be caused by the scanning of the tooth. For example, the scan data acquired may be incomplete resulting in a 3D digital defective tooth model missing one or more tooth sections. The incompletion of the scan data may, e.g., be caused by an incomplete and/or erroneous scan.

The 3D digital teeth model may further comprise soft tissue, like a gingiva, in addition to the hard tissue in form of the teeth, i.e., 3D digital teeth model may be provided in form of a 3D digital tissue model of at least a section of the patient's oral cavity. The 3D digital tissue model may be generated using scan data of the patient's oral cavity. For example, the patient's tissue in the oral cavity may be scanned using an intraoral scanner, e.g., an optical scanner. The achieved scan data may be used to provide the 3D digital tissue model of the scanned tissue of the oral cavity. For example, the upper and lower jaw, i.e., the mandibular dental arch and maxillary dental arch, are scanned. Alternatively, an impression of the patient's tissue in the oral cavity, i.e., a negative imprint of hard and soft tissue may be taken. Either this impression may be scanned, e.g., using an optical scanner or the negative imprint provided by the impression may be used to generate a positive reproduction of the patient's tissue, i.e., a 3D physical tissue model or cast, which is scanned, e.g., by the optical scanner to provide the scan data used to generate the 3D digital tissue model.

The 3D digital supplemented tooth model may, e.g., be used to generate a 3D digital restoration model configured to be arranged on the patient's tooth, after it has been prepared for receiving the dental restoration element defined by the 3D digital restoration model. The 3D digital restoration model may be used as a template for manufacturing the dental restoration element. For generating the 3D digital restoration model, the 3D digital supplemented tooth model may, e.g., be reduced in size resulting in a reduced 3D digital supplemented tooth model. The reduced 3D digital supplemented tooth model may define the preparation of the tooth, i.e., be used as a template for preparing the tooth. In order to provide the 3D digital restoration model, the reduced 3D digital supplemented tooth model may be subtracted from the 3D digital supplemented tooth model resulting in the 3D digital restoration model.

For example, the missing one or more tooth sections of the 3D digital defective tooth model results from one or more scan defects of a scan of the tooth of the patient. Examples may have the beneficial effect, that by supplementing the 3D digital defective tooth model a 3D digital supplemented tooth model may be provided, which is free of the one or more scan defects. Thus, the one or more scan defects may be corrected.

A missing tooth section in a scan may be due to multiple reasons. For example, a missing tooth section may be due to missing data. Scan data may be acquired using a scanner, e.g., an optical scanner, for scanning a tooth. In case a view of the scanner is obstructed, scan data for a certain section of the tooth may be missing, resulting in a 3D digital defective tooth model missing a tooth section. Furthermore, it may be necessary to remove one or more undesired portions of a 3D digital tooth model. Such a removal may result in a 3D digital defective tooth model. The removal may be executed automatically, semiautomatically, or manually. Removing sections from a 3D digital tooth model may for example be necessary in order to remove one or more scanning artifacts comprised by the respective section.

For example, the 3D digital defective tooth model resembles the tooth of the patient. The tooth of the patient is a damaged tooth missing one or more tooth sections. Examples may have the beneficial effect, that by generating the 3D digital supplemented tooth model a 3D digital model of is provided, which resembles the tooth of the patient without defects. The 3D digital supplemented tooth model may thus resemble a restored state of the tooth. This restored state of the tooth may be used as a target state for defining measures to restore the respective tooth. These measures may comprise generating a 3D digital restoration model as a template for manufacturing a dental restoration element in order to restore the tooth, i.e., in order to transfer the tooth from the current damaged state defined by the 3D digital defective tooth model to the target state defined by the 3D digital supplemented tooth model. These measures may comprise defining a preparation of the tooth, in order to prepare the tooth to receive the restoration element.

For example, the tooth of the patient is a tooth to be prepared for receiving a dental restoration element. The method further comprises reducing a size of the 3D digital supplemented tooth model by a pre-defined amount. The amount of the size reduction satisfies a restoration material depending minimum thickness required for a restoration material of the dental restoration element. An output is provided with the reduced 3D digital supplemented tooth model defining a preparation surface for the tooth of the patient for receiving the dental restoration element.

Examples may have the beneficial effect, that a definition of a preparation of the tooth to be prepared is provided. The reduced 3D digital supplemented tooth model defines a preparation of the tooth of the patient, i.e., a preparation surface for the respective tooth. Thus, the reduced 3D digital supplemented tooth is a 3D digital preparation model of the tooth to be prepared defining a state of preparation for the receptive tooth to be achieved. The reduced 3D digital supplemented tooth model may thus be provided as a template for preparing the tooth of the patient for receiving the dental restoration element.

Using a size reduction for generating the reduced 3D digital supplemented tooth model, which satisfies a thickness required for a restoration material of the dental restoration element may ensure that there is sufficient space of the prepared tooth to arrange a dental restoration element having a thickness, which is equal to or larger than a thickness required for a restoration material. The amount of the size reduction may satisfy the thickness required for a restoration material, it is equal to or larger than a minimum thickness of the restoration material of the dental restoration element. The amount of size reduction may define a size of the dental restoration element. In case a dental restoration element with a size equal to the amount of size reduction is arranged on the prepared tooth as defined by the reduced 3D digital supplemented tooth model, the resulting restored tooth may correspond to the 3D digital supplemented tooth model defining a state of restoration to be achieved.

The minimum thickness may define a minimum value, which is required for the thickness of the restoration material in order to ensure a suitable structural stability and/or durability of the dental restoration element. The minimum thickness may, e.g., be required to achieve an intended color and/or degree of transparency of the dental restoration element. The minimum thickness may be a restoration material specific thickness.

The amount of reduction of the 3D digital supplemented tooth model may be selected such that the filling tooth sections used for digitally filling of the missing tooth sections of the 3D digital defective tooth model are cut off. For example, the amount may be equal to or larger than a depth of the missing tooth sections. Examples may have the beneficial effect, that a 3D digital restoration model of the dental restoration element may be defined by a difference between the 3D digital supplemented tooth model and a reduced 3D digital supplemented tooth model. Using an amount equal to or larger than a depth of the missing tooth sections for the reduction of the 3D digital supplemented tooth model may thus result in a 3D digital restoration model of the dental restoration element configured for restoring all the missing tooth sections of the damaged tooth.

In order to implement a surface morphology on the surface of the dental restoration element fitting the patient's anatomical and/or aesthetical characteristics without coming into conflict with the minimum thickness, structural elements of the surface morphology, like, e.g., cusps, ridges, pits, grooves, and/or fissures, may be taken into account in addition to the minimum thickness. The amount of size reduction may in addition satisfy a thickness or depth of the surface morphology. Thus, the depth of the pre-defined surface morphology may be taken into account by the size reduction in addition to the minimum thickness. The surface morphology may be the surface morphology defined by the 3D digital supplemented tooth model. In this case, a dental restoration element comprising the surface morphology defined by the 3D digital supplemented tooth model may be arrangeable on the prepared tooth as defined by the reduced 3D digital supplemented tooth model, it may be ensured that even at a bottom of a groove of the surface morphology a thickness equal to or larger than the restoration material specific minimum thickness is implemented. Thus, it may be ensured that a thickness of the dental restoration element is large enough in all section of the dental restoration element to ensure a suitable structural stability and durability.

The amount of size reduction may in addition comprise a thickness of a bonding material, e.g., dental cement, to be applied between the dental restoration element to be arranged on the prepared tooth defined by the reduced 3D digital supplemented tooth model to be generated by the size reduction. The bonding material may be used to establish a bonding between the tooth element and the dental restoration. In this case, a dental restoration element may be arrangeable on the prepared tooth as defined by the reduced 3D digital supplemented tooth model resulting in a restored tooth as defined by the 3D digital supplemented tooth model. The dental restoration element may be bondable to the prepared tooth using a bonding material and at the same time, it may be ensured that a thickness of the dental restoration element is large enough to ensure a suitable structural stability and durability. For example, the thickness of the dental restoration element may be equal to or larger than the minimum thickness.

For example, the size of the 3D digital supplemented tooth model is reduced using surface shrinking with the 3D digital supplemented tooth model being shrunk by the pre-defined amount. Examples may have the beneficial effect, that a surface defining the 3D digital supplemented tooth model may be shrunk resulting in a shrunk surface defining the reduced 3D digital supplemented tooth model. The surface of the 3D digital supplemented tooth model may be shrunk such that a difference between the 3D digital supplemented tooth model and the reduced 3D digital supplemented tooth model is equal to or larger than the minimum thickness required by the restoration material. Subtracting the reduced 3D digital supplemented tooth model from the 3D digital supplemented tooth model may result in a 3D digital restoration model having a thickness, which is equal to or larger than the minimum thickness required by the restoration material. Using surface shrinking may result in a reduced 3D digital supplemented tooth model having the same geometrical proportions as the 3D digital supplemented tooth model. Thus, the shrinking may be proportional, i.e., the aspect ratio of the 3D digital supplemented tooth model may be preserved by the shrinking.

For example, the surface shrinking comprises a shrinking of the 3D digital supplemented tooth model, while preserving an anatomical form of the supplemented tooth model. The shrinking may be proportional, i.e., the aspect ratio of the 3D digital supplemented tooth model may be preserved by the shrinking. Thus, the anatomical form of the 3D digital supplemented tooth model may be preserved by the reduced 3D digital supplemented tooth model.

For example, the size of the 3D digital supplemented tooth model is reduced by subtracting the pre-defined amount from the 3D digital supplemented tooth model. Examples may have the beneficial effect, that by subtracting the pre-defined amount a reduced 3D digital supplemented tooth model may result with a difference to the 3D digital supplemented tooth model equal to the pre-defined amount. If the pre-defined amount satisfies the restoration material depending minimum thickness required for the restoration material, the difference between the 3D digital supplemented tooth model and the reduced 3D digital supplemented tooth model may satisfy the restoration material depending minimum thickness required for the restoration material. Subtracting the resulting reduced 3D digital supplemented tooth model from the 3D digital supplemented tooth model may thus result in a 3D digital restoration model having a thickness, which is equal to or larger than the minimum thickness required by the restoration material.

For example, the pre-defined amount of the size reduction further comprises one or more of the following: a depth of a surface morphology defined by the 3D digital supplemented tooth model, a thickness of a bonding material to be applied between the preparation surface defined by the reduced 3D digital supplemented tooth model and the dental restoration element. Examples may have the beneficial effect, that in addition to the minimum thickness a depth a surface morphology of 3D digital supplemented tooth model and/or a thickness of a bonding material to be applied to bond the dental restoration element to the preparation surface.

By the depth a surface morphology, a depth of structural elements of the surface morphology, like, e.g., cusps, ridges, pits, grooves, and/or fissures, may be taken into account in addition to the minimum thickness. The amount of size reduction may in addition satisfy a depth of the surface morphology. The surface morphology may be the surface morphology defined by the 3D digital supplemented tooth model. In this case, a dental restoration element comprising the surface morphology defined by the 3D digital supplemented tooth model may be arrangeable on the prepared tooth as defined by the reduced 3D digital supplemented tooth model, it may be ensured that even at a bottom of a groove of the surface morphology a thickness equal to or larger than the restoration material specific minimum thickness is implemented. Thus, it may be ensured that a thickness of the dental restoration element is large enough in all section of the dental restoration element to ensure a suitable structural stability and durability.

The amount of size reduction may in addition comprise a thickness of a bonding material, e.g., dental cement, to be applied between the dental restoration element to be arranged on the prepared tooth defined by the reduced 3D digital supplemented tooth model to be generated by the size reduction. The bonding material may be used to establish a bonding between the prepared tooth element and the dental restoration. In this case, a dental restoration element may be arrangeable on the prepared tooth as defined by the reduced 3D digital supplemented tooth model resulting in a restored tooth as defined by the 3D digital supplemented tooth model. The dental restoration element may be bondable to the prepared tooth using a bonding material and at the same time, it may be ensured that a thickness of the dental restoration element is large enough to ensure a suitable structural stability and durability.

For example, the method further comprises smoothing the preparation surface defined by the reduced 3D digital supplemented tooth model. Examples may have the beneficial effect, that the preparation surface defined by the reduced 3D digital supplemented tooth model may be smoother. The reductions of the 3D digital supplemented tooth model may result in reduced surface structures, which may, e.g., neither be advantageous regarding a structural stability and durability of the dental restoration element to be arranged on the preparation surface nor regarding a bonding of the dental restoration element on the preparation surface. The reduced surface structures may rather be fine structures challenging to be prepared. Thus, by smoothing the preparation surface a reduced 3D digital supplemented tooth model may be provided, which be used as a template for an easier preparation of the tooth. The smoothening may, e.g., be achieved using a Laplacian smoothing.

For example, the reducing of the size of the 3D digital supplemented tooth model further comprises subtracting one or more convex portions. For example, the one or more convex portions being subtracted may be lateral convex portions. The one or more lateral convex portions may comprise one or more of the following: a mesial convex portion, a distal convex portion, a vestibular, e.g., labial or buccal, convex portion, an oral, e.g., lingual or palatal, convex portion. For example, the one or more convex portions being subtracted may be convex portions of the reduced 3D digital supplemented tooth model being subtracted additionally after the size of the 3D digital supplemented tooth model has been reduced by the pre-defined amount. For example, the one or more convex portions being subtracted may be convex portions of the 3D digital supplemented tooth model being subtracted before the size of the 3D digital supplemented tooth model is reduced by the pre-defined amount. For example, lateral convex portions may be subtracted circumferentially around the tooth model.

Examples may have the beneficial effect, that by subtracting convex portions the shape of the resulting reduced 3D digital supplemented tooth model may be flattened in a direction from crown to root, thereby improving the fitting of the dental restoration element onto the prepared tooth as defined by the reduced 3D digital supplemented tooth model missing the subtracted convex portions. By subtracting lateral convex portions, undercuts of the reduced 3D digital supplemented tooth model may be reduced compare to the reduced 3D digital supplemented tooth model without subtraction of the lateral convex portions. By subtracting lateral convex portions, a tapering of the reduced 3D digital supplemented tooth model towards the root of the tooth represented by the respective tooth model may be reduced compare to the reduced 3D digital supplemented tooth model without subtraction of the lateral convex portions.

Reducing undercuts may have the beneficial effect, that a danger of food getting stuck in any gaps between the prepared tooth element and the dental restoration element resulting from undercuts of prepared tooth element may be reduced. A remaining, e.g., minimal, undercut may be desired, in case the dental restoration element should be fixated onto the prepared tooth element without using any bonding material, like dental cement. The remaining undercut may, e.g., establish a frictional connection, i.e., a frictional adhesion, between the prepared tooth element and the dental restoration element arranged thereon. The resulting frictional connection may, e.g., be a non-destructively detachable connection.

By subtracting lateral convex portions, the lateral surfaces of the reduced 3D digital supplemented tooth model may be straightened in a direction from crown to root. The resulting lateral surfaces of the reduced 3D digital supplemented tooth model may, e.g., have a reduced convex curvature, i.e., the radius of curvature may be increased. The resulting lateral surfaces of the reduced 3D digital supplemented tooth model may, e.g., be straight surfaces in a direction from crown to root. The resulting lateral surfaces of the reduced 3D digital supplemented tooth model may, e.g., have a reduced tapering towards the root of the tooth.

For example, the merging comprises adapting the one or more filling tooth sections of 3D digital artificial tooth model used to supplement the 3D digital defective tooth model to fit into and fill the one or more missing tooth sections of the 3D digital tooth model.

Examples may have the beneficial effect, that the one or more filling tooth sections of 3D digital artificial tooth model used for supplementing the 3D digital defective tooth model may be adapted, e.g., fine adjusted, to better fit into and fill the one or more missing tooth sections of the 3D digital defective tooth model.

For example, the merging comprises adjusting the size of the 3D digital artificial tooth model to match the size of the 3D digital defective tooth model. Thus, the size of the 3D digital artificial tooth model may be scaled to match the size of the 3D digital defective tooth mode. Examples may have the beneficial effect, that the resulting scaled 3D digital artificial tooth model matches the 3D digital defective tooth model.

For example, the size of the 3D digital artificial tooth model is adjusted using scaling. In case the 3D digital defective tooth model is smaller than the 3D digital artificial tooth model, the size of the 3D digital artificial tooth model may be adjusted by scaling down the size of the 3D digital artificial tooth model. In case the 3D digital defective tooth model is larger than the 3D digital artificial tooth model, the size of the 3D digital artificial tooth model may be adjusted by scaling up the size of the 3D digital artificial tooth model. Thus, the size of the 3D digital artificial tooth model may either be scaled down or up in order to match the size of the 3D digital defective tooth model.

For example, the scaling down as well as the scaling up may preserve an anatomical form of the supplemented tooth model. The scaling down and scaling up may be proportional, i.e., the aspect ratio of the 3D digital artificial tooth model may be preserved by the scaling up as well as by the scaling down. Thus, the anatomical form of the 3D digital artificial tooth model may be preserved by the reduced 3D digital artificial tooth model in case of a down scaling. In case of an up scaling, as well the anatomical form of the 3D digital artificial tooth model may be preserved by the resulting increased 3D digital artificial tooth model.

For example, the one or more filling tooth sections of the 3D digital artificial tooth model used to supplement the 3D digital defective tooth model comprises at least a part of an occlusal surface of the 3D digital artificial tooth model. Examples may have the beneficial effect, that by supplementing the 3D digital defective tooth model with the one or more filling tooth sections an occlusal surface of the 3D digital defective tooth model with defects due to the missing one or more tooth sections may be restored.

The 3D digital teeth model comprises a 3D digital antagonist model of an antagonist of the tooth of the patient. The merging comprises adjusting the occlusion of the 3D digital artificial tooth model using the 3D digital antagonist model. Examples may have the beneficial effect, that the 3D digital antagonist model may be used to adjust the occlusion of the 3D digital artificial tooth model and thus the occlusal surface provided by the one or more filling tooth sections of the 3D digital artificial tooth model to the anatomical characteristics of the patient's dentition, in particular to the antagonist.

The occlusion describes the relationship between the maxillary and mandibular teeth, when these teeth approach each other, as occurs, e.g., during chewing or at rest. Static occlusion refers to contact between teeth when the lower jaw is closed and stationary relative to the upper jaw, while dynamic occlusion refers to occlusal contacts made when the lower jaw is moving relative to the upper jaw. In order to determine an occlusion of a patient data regarding the relative position of the patient's mandibular dental arch to the maxillary dental arch, i.e., to the patient's occlusion, may be received. This data may be data acquired, e.g., using a jaw movement registration system. The jaw movement registration system may be configured to record jaw motions and relative positions of a patient's jaws. The jaw movement registration system may comprise a face bow, e.g., a digital face bow. A face-bow refers to a dental instrument used in the field of prosthodontics, which is used recording and transferring relative positions of the patient's jaws. In case of a digital face bow the data may be recorded in digital form and transferred to program used for displaying and/or simulating the positions of the patient's jaws. The face bow may, e.g., be used to transfer a relationship of a patient's maxillary arch and temporomandibular joint. The acquired data regarding this relation may, e.g., be used jaw motions and relative positions of a patient's jaws may be used to simulate a static and/or dynamic occlusion of the patient. For example, the data may be transferred to a digital articulator. The digital articulator may be comprised by the jaw movement registration system and used for simulating the static and/or dynamic occlusion of the patient.

For example, the artificial tooth is a library tooth. The providing of the 3D digital artificial tooth model comprises selecting the 3D digital artificial tooth model from a set of 3D digital artificial tooth models of library teeth. Examples may have the beneficial effect, that a pre-defined 3D digital tooth model provided by the set of 3D digital artificial tooth models of library teeth may be selected and used to provide the one or more filling tooth sections for generating the 3D digital supplemented tooth model. Thus, the one or more filling tooth sections may not have to be generated from scratch.

For example, the method comprises selecting one or more features of the 3D digital defective tooth model. The one or more selected features are used as one or more selection criteria for selecting the 3D digital artificial tooth model from the set of 3D digital artificial tooth models of library teeth. A 3D digital tooth model of the set of 3D digital artificial tooth models of library teeth which best fits the one or more selection criteria is selected as the 3D digital artificial tooth model.

Examples may have the beneficial effect, that a pre-defined 3D digital tooth model provided by the set of 3D digital artificial tooth models of library teeth may be selected that best fits the one or more selection criteria. The better the selected pre-defined 3D digital tooth model fits the selection criteria, i.e., matches the selected features of the 3D digital defective tooth model, the less adjustments may be required. For example, the geometric features used for selecting the pre-defined 3D digital tooth model may be features, which are independent of the missing tooth sections, i.e., which are solely defined by the remaining tooth sections comprised by the 3D digital defective tooth model.

For example, the one or more features comprise one or more of the following geometric features: size, form, proportions, surface structure. Examples may have the beneficial effect, that a pre-defined 3D digital tooth model provided by the set of 3D digital artificial tooth models of library teeth may be selected that best fits the geometry of the 3D digital defective tooth model, i.e., size, form, proportion and/or surface structure. For example, the geometric features used may be geometric features, which are independent of the missing tooth sections, i.e., which are solely defined by the remaining tooth sections comprised by the 3D digital defective tooth model.

For example, the method comprises selecting one or more additional features of one or more additional 3D digital tooth models comprised by the 3D digital teeth model other than the 3D digital defective tooth model. The one or more additional features are used as one or more additional selection criteria for selecting the 3D digital artificial tooth model from the set of 3D digital artificial tooth models of library teeth.

Examples may have the beneficial effect, that by using one or more additional features of one or more additional 3D digital tooth models other than the 3D digital defective tooth model even features related to the missing tooth sections may be used for selecting the pre-defined 3D digital tooth model. Tooth sections corresponding to the tooth sections, which are missing in the 3D digital defective tooth, may be present in of other 3D digital tooth models comprised by 3D digital teeth model. Such addition other 3D digital tooth models may, e.g., be 3D digital tooth models of a neighboring tooth and/or an antagonist of the tooth of the patient. These corresponding sections may comprise anatomical and/or aesthetical features, which are characteristic for patient. Using these characteristic features may allow for selecting a pre-defined 3D digital tooth model provided by the set of 3D digital artificial tooth models of library teeth with features that match the patient's anatomical and/or aesthetical features. Thus, anatomical and/or aesthetical features of the dentition of the patient may be taken into account.

For example, the one or more additional features comprise one or more of the following geometric features: size, form, proportions, surface structure. Examples may have the beneficial effect, that a pre-defined 3D digital tooth model provided by the set of 3D digital artificial tooth models of library teeth may be selected that best fits the geometry of the 3D digital defective tooth model, i.e., size, form, proportion and/or surface structure. Using one or more additional features of one or more additional 3D digital tooth models may allow to take into account even such geometric features, which depend on or are related to the missing tooth sections.

For example, the one or more additional 3D digital tooth models comprised by the 3D digital teeth model comprise at least one of the following: one or more 3D digital tooth models of neighboring teeth of the tooth of the patient, the 3D digital antagonist model of the tooth of the patient.

Examples may have the beneficial effect, that features of one or more neighboring teeth and/or of the antagonist of the tooth of the patient may be taken into account. Such features may be similar and/or equal to features to be expected for the missing tooth sections of the 3D digital defective tooth model.

For example, the method comprises using a trained machine learning module for generating the 3D digital supplemented tooth model of the tooth of the patient. The trained machine learning module is configured using the 3D digital artificial tooth model to provide the 3D digital supplemented tooth model as output in response to receiving the 3D digital defective tooth model as input.

Examples may have the beneficial effect, that the trained machine learning module may be used for generating the 3D digital supplemented tooth model of the tooth of the patient. The 3D digital supplemented tooth model is provided as output by the trained machine learning module in response to receiving the 3D digital defective tooth model as input. For example, the 3D digital teeth model comprising the 3D digital defective tooth model may be provided as input. For example, the input may comprise an identifier identifying the 3D digital defective tooth model to be supplemented.

For example, the trained machine learning module may be trained to provide the 3D digital supplemented tooth model in form of a reduced 3D digital supplemented tooth model and a 3D digital restoration model. The 3D digital restoration model may, e.g., correspond to a difference between the 3D digital supplemented tooth model and the reduced 3D digital supplemented tooth model. Thus, the combination of the reduced 3D digital supplemented tooth model and the 3D digital restoration model may correspond to a split version of the 3D digital supplemented tooth model. In addition, an identifier identifying a restoration material to be used for the dental restoration element and/or a restoration material depending minimum thickness may be provided as input. The trained machine learning module may be provided with a set of restoration material depending minimum thicknesses, each assigned to a restoration material of a plurality of restoration materials available for selection, e.g., based on restoration material identifier. The restoration material depending minimum thickness may be taken into account by the machine learning module for determining an amount of size reduction of the reduced 3D digital restoration model relative to the 3D digital restoration model, in order to define the reduced 3D digital restoration model.

For example, the trained machine learning module is configured to receive the 3D digital artificial tooth model as input in order to provide the 3D digital supplemented tooth model as output. Examples may have the beneficial effect, that the trained machine learning module may in addition use the 3D digital artificial tooth model to provide the 3D digital supplemented tooth model as output. Alternatively, the trained machine learning module may receive an identifier identifying a 3D digital artificial tooth model of a set of 3D digital artificial tooth models of library teeth, to which the trained machine learning module has access. Alternatively, the trained machine learning module may be provided with a set of 3D digital artificial tooth models of library teeth comprising a plurality of 3D digital artificial tooth model and trained to select one of these 3D digital artificial tooth to be used for supplementing the 3D digital defective tooth model and providing the resulting 3D digital supplemented tooth as output.

For example, the trained machine learning module is configured to receive the 3D digital defective tooth model as part of the 3D digital teeth model. The 3D digital teeth model comprises one or more additional 3D digital tooth models of the denture of the patient. Examples may have the beneficial effect, that the trained machine learning module may be trained to take into account additional 3D digital tooth models, like 3D digital tooth models of neighboring teeth and/or antagonists, for supplementing the 3D digital defective tooth model and providing the resulting 3D digital supplemented tooth as output.

For example, the trained machine learning module may be configured for determining features of one or more additional 3D digital tooth models comprised by the 3D digital teeth model other than the 3D digital defective tooth model and use these features as selection criteria for selecting a 3D digital artificial tooth model from the set of 3D digital artificial tooth models of library teeth.

For example, the one or more additional 3D digital tooth models of the denture of the patient comprises at least one of the following: one or more 3D digital neighboring tooth models of the tooth of the patient, the 3D digital antagonist model of the tooth of the patient. Examples may have the beneficial effect, that features of one or more neighboring teeth and/or of the antagonist of the tooth of the patient may be taken into account. Such features may be similar and/or equal to features to be expected for the missing tooth sections of the 3D digital defective tooth model.

For example, the method further comprises providing the trained machine learning module. The providing of the trained machine learning module comprises providing a machine learning module to be trained. A set of training datasets is provided for training the machine learning module to be trained. Each training dataset comprises a 3D digital training defective tooth model missing one or more tooth sections as well as a 3D digital training supplemented tooth model with one or more of the missing tooth sections of the 3D digital training defective tooth model of the respective training dataset being supplemented with one or more filling tooth sections. 3D digital training artificial tooth models are provided. The machine learning module to be trained is trained using the 3D digital training artificial tooth models to provide the 3D digital training supplemented models of the training datasets as an output in response to receiving the 3D digital training defective tooth models of the respective training datasets as input.

The machine learning module to be trained may, e.g., be an untrained machine learning module, a pre-trained machine learning module or a partially trained machine learning module. The machine learning module being trained may be an untrained machine learning module, which is trained from scratch. Alternatively, the machine learning module being trained may be a pre-trained or partially trained machine learning module. In general, it may not be necessary to start with an untrained machine learning module, e.g., in deep learning. For example, one may start with a pre-trained or partially trained machine learning module. The pre-trained or partially trained machine learning module may have been pre-trained or partially trained for the same or a similar task. Using a pre-trained or partially trained machine learning may, e.g., enable a faster training of the trained machine learning module to be trained, i.e., the training may converge faster. For example, transfer learning may be used for training a pre-trained or partially trained machine learning module. Transfer learning refers to a machine learning process, which rather than starting the learning process from scratch starts from patterns that have been previously learned, when solving a different problem. This way previous learnings may, e.g., be leveraged, avoiding to start from scratch. A pre-trained machine learning module is a machine learning module that was trained previously, e.g., on a large benchmark dataset to solve a problem similar to the one to be solved by the additional learning. In case of a pre-trained machine learning module a previous learning process has been completed successfully. A partially trained machine learning module is a machine learning module, which has been partially trained, i.e., the training process may not have been completed yet. A pre-trained or partially machine learning module may, e.g., be import and trained to be used for the purposes disclosed herein.

Examples may have the beneficial effect, that by training the machine learning module to be trained, the machine learning module may be configured to provide the 3D digital supplemented model as output in response to receiving the 3D digital defective tooth model as input. In order to achieve this goal, a set, i.e., a plurality, of suitable training datasets may be provided. Each of the training datasets may comprise a 3D digital training defective tooth model missing one or more tooth sections as well as a 3D digital training supplemented tooth model. The 3D digital training supplemented tooth model corresponds to the 3D digital training defective tooth model of the respective training dataset with one or more of the missing tooth sections supplemented with one or more filling tooth sections.

Thus, the resulting trained machine learning module may be configured to provide the 3D digital supplemented tooth model as output in response to receiving the 3D digital defective tooth model as input.

For example, the trained machine learning module may be trained to provide the 3D digital supplemented tooth model in form of a reduced 3D digital supplemented tooth model and a 3D digital restoration model. The 3D digital training supplemented tooth models provided as training data by the training datasets may, e.g., be provided in form of split versions of 3D digital supplemented tooth models, i.e., as combinations of the reduced 3D digital training supplemented tooth models and 3D digital training restoration models. The 3D digital training restoration model may, e.g., correspond to a difference between the 3D digital training supplemented tooth model and the reduced 3D digital training supplemented tooth model. In addition, the training datasets may comprise a training identifier identifying a restoration material to be used for the dental restoration element and/or a restoration material depending minimum thickness. The machine learning module to be trained may be provided with a set of restoration material depending minimum thicknesses, each assigned to a restoration material of a plurality of restoration materials available for selection. The restoration material depending minimum thickness may be used for determining an amount of size reduction of the reduced the 3D digital training supplemented tooth model relative to the between the 3D digital training supplemented tooth model.

For example, the 3D digital training artificial tooth models are comprised by the training datasets as additional input for training the machine learning module to be trained in combination with the 3D digital training defective tooth model of the respective training dataset. For example, the training datasets may comprise identifier identifying 3D digital artificial tooth models of a set of 3D digital artificial tooth models of library teeth as the 3D digital training artificial tooth models to be used for training the machine learning module to be trained. For example, the machine learning module to be trained may be trained to select a 3D digital artificial tooth model of the set of 3D digital artificial tooth models of library teeth as the 3D digital training artificial tooth model. In this case, the identifier of the 3D digital artificial tooth model is used as an output for training the machine learning module to be trained.

Examples may have the beneficial effect, that the machine learning module may be further trained to take a 3D digital artificial tooth model into account, when providing a 3D digital supplemented tooth model as output. The 3D digital training artificial tooth model may, e.g., be provided as part of the training dataset. Alternatively, the machine learning module to be trained may be provided with a set of 3D digital artificial tooth models of library teeth comprising a plurality of 3D digital artificial tooth model. Each training dataset may comprise an identifier identifying one of the 3D digital tooth models of the set of 3D digital artificial tooth models of library teeth to be used to for supplementing the 3D digital training defective tooth model and providing the resulting 3D digital training supplemented tooth as output. The machine learning module to be trained may thus be trained to select one of these 3D digital artificial tooth to be used for supplementing the 3D digital defective tooth model and providing the resulting 3D digital supplemented tooth as output.

For example, the training datasets comprises the 3D digital training defective tooth models as parts of 3D digital training teeth models. The 3D digital training teeth model each comprises one or more teeth of a training denture in addition to the training damaged tooth.

Examples may have the beneficial effect, that the machine learning module to be trained may be trained to take into account additional 3D digital training tooth models, like 3D digital training tooth models of neighboring teeth and/or antagonists, for supplementing the 3D digital training defective tooth model and providing the resulting 3D digital training supplemented tooth as output. For example, the training datasets may comprise as further input an identifier identifying the 3D digital defective tooth model to be supplemented.

For example, the machine learning module to be trained may be trained for determining features of one or more additional 3D digital training tooth models comprised by the 3D digital training teeth model other than the 3D digital training defective tooth model and use these features as selection criteria for selecting a 3D digital artificial tooth model from the set of 3D digital artificial tooth models of library teeth.

For example, the one or more additional teeth of the 3D digital training teeth model of each of the training datasets comprise at least one of the following: one or more 3D digital tooth models of training neighboring teeth of the 3D digital training defective tooth model of the respective training dataset, a 3D digital tooth model of a training antagonist of the 3D digital training defective tooth model of the respective training dataset. Examples may have the beneficial effect, that the machine learning module to be trained may be trained to take into account features of one or more training neighboring teeth and/or of the training antagonist of the 3D digital training defective tooth model. Such features may be similar and/or equal to features to be expected for the missing tooth sections of the 3D digital training defective tooth model.

The term "machine learning" (ML) refers to a computer algorithm used to extract useful information from training data sets by building probabilistic models, which are referred to as machine learning modules or models, in an automated way. A machine learning module may also be referred to as a predictive model. Machine learning algorithms build a mathematical model based on sample data, known as "training data", in order to make predictions or decisions without being explicitly programmed to perform the task. The machine learning may be performed using a learning algorithm such as supervised or unsupervised learning. The machine learning may be based on various techniques such as clustering, classification, linear regression, reinforcement, self-learning, support vector machines, neural networks, etc. A machine learning module may, e.g., be a data structure or program such as a neural network, in particular a convolutional neural network, a support vector machine, a decision tree, a Bayesian network etc. The machine learning module may be adapted to predict an unmeasured value, e.g., a 3D digital supplemented tooth model as output by the trained machine learning module. The trained machine learning module may predict the unmeasured value from other, known values, e.g., a 3D digital defective tooth model as input. The 3D digital defective tooth model may be comprised by a 3D digital teeth model. For example, an identifier may be provided identifying the 3D digital defective tooth model comprised by the 3D digital teeth model. The 3D digital teeth model may, e.g., comprise one or more 3D digital tooth models of neighboring teeth of the 3D digital defective tooth model and/or a 3D digital tooth model of an antagonist of the 3D digital defective tooth model. Furthermore, e.g., a 3D digital artificial tooth model may be provided as additional input. For example, a set of 3D digital artificial tooth models of library teeth may be provided and the trained machine learning may be trained to select a 3D digital artificial tooth model from the set of 3D digital tooth models for generating the 3D digital supplemented tooth model provided as output. According to an example, the machine learning module comprises a deep learning model.

For example, the restoration material depending minimum thickness is defined to ensure at least one of the following: a sufficient structural stability of the dental restoration element, a pre-defined color of the dental restoration element, a pre-defined transparency of the dental restoration element.

Examples may have the beneficial effect, that reducing a size of the 3D digital supplemented tooth model by a pre-defined amount satisfying a restoration material depending minimum thickness may ensure a sufficient structural stability of the dental restoration element, the pre-defined color of the dental restoration element, and/or the pre-defined transparency of the dental restoration element. For example, the amount may be equal to or larger, e.g., slightly larger, than the restoration material depending minimum thickness. The amount may be larger taking further into account a surface morphology of the dental restoration element and/or a layer of bonding material to be arranged between the dental restoration element and the prepared tooth.

Examples may have the beneficial effect, that between a preparation surface define by the reduced 3D digital supplemented tooth model and a surface of the dental restoration element defined by the 3D digital supplemented tooth model there may be sufficient space for a dental restoration element with a thickness satisfying the restoration material depending minimum thickness. For example, the dental restoration element may be defined by a subtraction of the reduced 3D digital supplemented tooth model from the 3D digital supplemented tooth model. The resulting 3D digital restoration model satisfying the restoration material depending minimum thickness may have a sufficient structural stability, the pre-defined color, and/or the pre-defined transparency.

For example, the pre-defined amount is larger than the restoration material depending minimum thickness by an additional amount, if a depth of the one or more missing tooth sections is larger than the restoration material depending minimum thickness. The additional amount is selected to cut off the one or more filling tooth sections used to fill the one or more missing tooth sections. Examples may have the beneficial effect, that the missing tooth sections may be cut off, when using the reduced 3D digital supplemented tooth model as a template for preparing the damaged tooth for receiving the dental restoration element. In case the pre-defined amount, by which the 3D digital supplemented tooth model is reduced, is smaller than of the one or more missing tooth sections, preparing the tooth using the surface defined by the reduced 3D digital supplemented tooth model as a template for the preparation surface of the damaged tooth to be achieved by the preparation parts of the missing tooth sections may still remain. The remaining parts may be the part of the missing tooth sections extending deeper into the damaged tooth than the pre-defined amount, by which the 3D digital supplemented tooth model is reduced. However, by selecting an amount large enough to cut off the filling tooth sections and thus the missing tooth sections, e.g., as large as a depth of the missing tooth sections, the missing tooth sections are cut off by a preparation of the damaged tooth using the resulting reduced 3D digital supplemented tooth model as template. The additional amount may, e.g., be smaller than a pre-defined threshold in order to avoid removing to much tissue from the damaged tooth in order to prepare the tooth, when using the reduced 3D digital supplemented tooth model as template.

One or more of the missing tooth sections may, e.g., be holes extending into the damaged tooth. For example, the pre-defined amount is larger than the restoration material depending minimum thickness by an additional amount. The additional amount may be selected to be large enough to cut off one or more holes extending into the damaged tooth. Examples may have the beneficial effect, that holes extending into the damaged tooth may be taken into account and cut off. In case the pre-defined amount, by which the 3D digital supplemented tooth model is reduced, is smaller than a depth of a hole extending into the damaged tooth, preparing the tooth using the surface defined by the reduced 3D digital supplemented tooth model as a template for the preparation surface of the damaged tooth to be achieved by the preparation a part of the hole will still remain. The remaining part may be the part of the hole extending deeper into the damaged tooth than the pre-defined amount, by which the 3D digital supplemented tooth model is reduced. However, by selecting an amount large enough to cut off the hole, e.g., lager than a depth of the hole, the hole is cut off by a preparation of the damaged tooth using the resulting reduced 3D digital supplemented tooth model as template. The additional amount may, e.g., be smaller than a pre-defined threshold in order to avoid removing to much tissue from the damaged tooth in order to prepare the tooth, when using the reduced 3D digital supplemented tooth model as template.

For example, the pre-defined threshold may be selected such that the prepared tooth has a predefined minimum size. In case a depth of one of the missing tooths sections is larger than the threshold, such that the missing tooths section is not completely cut off by the preparation of the damaged tooth, but still extends into the prepared tooth, the dental restoration element may be configured to fill this remaining part of missing tooths section. The depth of the missing tooth section may, e.g., be defined as an extension of the missing tooth section perpendicular to the surface of the 3D digital supplemented tooth model and/or as an extension of the missing tooth section from the surface of the 3D digital supplemented tooth model toward a center of the 3D digital supplemented tooth model. The reduced 3D digital supplemented tooth model used as template for the preparation may in addition be applied with the remaining parts of the missing tooths sections. The remaining parts of the missing tooths sections may be removed from the reduced 3D digital supplemented tooth model. For example, the remaining parts of the missing tooths sections may further be smoothened by removing additional parts. For defining a 3D digital restoration model of the dental restoration element, the reduced 3D digital supplemented tooth model with the remaining parts of the missing tooths sections may be subtracted from the 3D digital supplemented tooth model.

For example, the method further comprises defining a preparation line limiting a section of the damaged tooth to be prepared to receive the dental restoration element. The reducing of the size of the 3D digital supplemented tooth model is limited to a reducing of the size of the section of the damaged tooth to be prepared and limited by the preparation line.

Examples may have the beneficial effect, that a preparation of the damaged tooth may be limited to a selected section of the damaged tooth. This section may be limited by a preparation line. For example, the preparation line limiting the section of the tooth to be prepared may be added to the 3D digital supplemented tooth model. The preparation line may define as section of the 3D digital supplemented tooth model to which the reducing of the size of the 3D digital supplemented tooth model may be limited. Thus, the reducing of the size of the 3D digital supplemented tooth model may, e.g., be limited to a section of the 3D digital supplemented tooth model defined by a preparation line. The resulting reduced 3D digital supplemented tooth model may in comparison with the 3D digital supplemented tooth model, e.g., only be reduced in the section defined by a preparation line. The section of the tooth limited by the preparation line may, e.g., at least comprise the missing tooth sections of the damaged tooth to be prepared. Thus, the section of the 3D digital supplemented tooth model resulting from the digitally filling of the missing tooth sections with filling tooth sections being reduced may at least comprise the missing tooth sections. The amount of reduction may be selected to at least cut off the missing tooth sections.

When reducing the size of the section of the 3D digital supplemented tooth model relative to the rest of the 3D digital supplemented tooth model resulting gaps may be interpolated. The reduced 3D digital supplemented tooth model may define a preparation surface within the section defined by a preparation line, which may be provided as a template for preparing the damaged tooth within the section defined by a preparation line.

For example, the 3D digital defective tooth model is provided in form of a 3D digital mesh. One or more of the filling tooth sections used to supplement the 3D digital defective tooth model are provided using a mesh filling algorithm for closing mesh holes in 3D digital meshes.

Examples may have the beneficial effect, that for supplementing the 3D digital defective tooth model with filling tooth sections a mesh filling algorithm may be used. The mesh may, e.g., comprise a plurality of vertices. A vertex defines a position in 3D space. In addition, a vertex may be assigned with additional information, like a normal vector. A normal vector may, e.g., be defined implicitly, e.g., as a weighted average of normals of adjacent triangles. A vertex w is said to be adjacent to another vertex v, if the mesh contains an edge (v, w). An edge is a connection between two vertices. A mesh may be represented in different ways, using different methods to store data defining elements of the mesh, like the vertex, edge and/or face data. A face is a closed set of edges. A triangle face for example is a closed set comprising three edges. Exemplary representations of meshes, e.g., comprise face-vertex meshes, winged-edge meshes, half-edge meshes, quad-edge meshes, corner-table meshes, vertex-vertex meshes, render dynamic meshes etc.

For example, the mesh filling algorithm is used for filling mesh holes satisfying a pre-defined filling criterion. The pre-defined filling criterion defines a maximum size for mesh holes being closed using the mesh filling algorithm.

Examples may have the beneficial effect, that usage of the mesh filling algorithm may, e.g., be restricted to mesh holes, i.e., missing tooth sections, with a size smaller than or equal to a maximum size defined by the pre-defined filling criterion.

For example, the dental restoration element is one of the following: a crown, an inlay, an onlay, an overlay.

A crown is a dental restoration element in form of a dental cap that completely caps or encircles a tooth or dental implant. A crown may, e.g., be required when a large cavity threatens the health of a tooth. A crown may be bonded to the tooth prepared for receiving the crown using a bonding material, e.g., a dental cement. A crown may be made from various materials, which may be fabricated using indirect methods, i.e., outside the patient's oral cavity. Crowns may be used to improve strength, to improve appearance of teeth and/or to halt deterioration.

Inlays, onlays, and overlays are forms of indirect restoration manufactured outside of a patient's oral cavity as a single, solid piece that fits a specific size and shape of a reception prepared within a tooth of the oral cavity. Inlay, onlay, or overlay are partial crowns, which are bonded, e.g., cemented, in place on the prepared tooth.

An inlay is configured to cover an inner, e.g., central, section of an occlusal surface of a tooth. Thus, an inlay may be used to replace an internal part of a damaged tooth and cover part of the occlusal surface of the respective tooth. The inlay is positioned within hard tissues of the tooth, but does not cover a cusp or pointed part of the tooth. In comparison to an inlay, an onlay in addition covers at least one of the cusps of the tooth. In comparison to an onlay, an overlay covers a larger portion of the occlusal surface of the tooth extending beyond the cusps.

For example, the method further comprises generating a 3D digital restoration model of the dental restoration element. The generating of the 3D digital restoration model comprises subtracting the reduced 3D digital supplemented tooth model from the 3D digital supplemented tooth model.

Examples may have the beneficial effect, that a 3D digital restoration model of the dental restoration element may be generated. The 3D digital restoration model of the dental restoration element may be used as a template for manufacturing a dental restoration element for restoring the damaged tooth. The dental restoration element defined by the respective 3D digital restoration model may be configured to be arranged on the prepared damaged tooth after it has been prepared to match the reduced 3D digital supplemented tooth model. When arranging the dental restoration element on the prepared damaged tooth, the resulting restored tooth may resemble the 3D digital supplemented tooth model. The 3D digital restoration model of the dental restoration element may be defined by the difference between the 3D digital supplemented tooth model and the reduced 3D digital supplemented tooth model. An outer surface of the 3D digital restoration model of the dental restoration element, facing away from the prepared tooth, when being arranged on the same, may correspond to an outer surface of the 3D digital supplemented tooth model. A surface of the 3D digital restoration model of the dental restoration element, facing towards the prepared tooth, when being arranged on the same, may correspond to a negative of a preparation surface of the tooth defined the surface of the reduced 3D digital supplemented tooth model.

For example, the reducing of the size of the 3D digital supplemented tooth model may be limited to a section of the 3D digital supplemented tooth model defined by a preparation line. The preparation line may define a section of the damaged tooth to be prepared to receive the dental restoration element. For this purpose, the preparation line may be defined on the 3D digital supplemented tooth model limiting a section of the 3D digital supplemented tooth model to be reduced in order to define a section of the damaged tooth to be prepared to receive the dental restoration element. When reducing the size of the section of the 3D digital supplemented tooth model relative to the rest of the 3D digital supplemented tooth model resulting gaps may be interpolated.

For example, the method further comprises manufacturing the dental restoration element using the 3D digital restoration model as template. The manufactured dental restoration element is a physical copy of the respective template.

Examples may have the beneficial effect, that a physical dental restoration element may be provided. The physical dental restoration element may be configured to be arranged on the damaged tooth after being prepared as defined by the reduced 3D digital supplemented tooth model. When arranging the dental restoration element on the prepared damaged tooth, the resulting restored tooth may resemble the 3D digital supplemented tooth model.

For example, the restoration element is manufactured using one of the following: machining, 3D printing, casting.

Examples may have the beneficial effect, that the dental restoration element may be manufactured using a machining device configured to manufacture the dental restoration element by processing a blank of restoration material. The resulting dental restoration element may be configured to be arranged on the damaged tooth after being prepared as defined by the reduced 3D digital supplemented tooth model. For example, the dental restoration element may be manufactured using a 3D printing device, i.e., a printer, configured to print the dental restoration element. The resulting dental restoration element may be configured to be arranged on the damaged tooth after being prepared as defined by the reduced 3D digital supplemented tooth model.

For example, the 3D digital restoration model may be used as a positive to define a negative of the physical dental restoration element in form of a negative 3D digital restoration model. The negative 3D digital restoration model may be used to manufacture, e.g., using machining or 3D printing, a casting matrix. The casting matrix may be configured for casting the physical dental restoration element by inserting restoration material into the casting matrix and curing the inserted restoration material. The resulting dental restoration element may be configured to be arranged on the damaged tooth after being prepared as defined by the reduced 3D digital supplemented tooth model.

In another aspect, the invention relates to a computer program product for restoring a 3D digital defective tooth model of a tooth of a patient. The computer program product comprises a computer readable storage medium having program instructions embodied therewith. The program instructions are executable by a processor of a computer device to cause the computer device to receive a 3D digital teeth model of at least a part of a dentition of a patient. The 3D digital teeth model comprises at least the 3D digital defective tooth model. A 3D digital supplemented tooth model of the tooth of the patient is generated. The generating of the 3D digital supplemented tooth model comprises supplementing the 3D digital defective tooth model with one or more filling tooth sections used to fill one or more of the missing tooth sections.

At least one of the one or more filling tooth sections used to supplement the 3D digital defective tooth model is provided using a 3D digital artificial tooth model of an artificial tooth. The supplementing of the filling tooth sections further comprises providing the 3D digital artificial tooth model. The 3D digital defective tooth model is overlaid with the 3D digital artificial tooth model. The 3D digital defective tooth model is merged with the 3D digital artificial tooth model by adding at least one tooth section of the 3D digital artificial tooth model missing in the 3D digital defective tooth model as the respective at least one filling tooth section to the 3D digital defective tooth model for generating the 3D digital supplemented tooth model.

The program instructions provided by the computer program product may be configured for causing the computer device to execute any of the aforementioned methods for restoring a 3D digital defective tooth model.

For example, the tooth of the patient is a tooth to be prepared for receiving a dental restoration element. The surface to be defined is a preparation surface. The program instructions further are executable by a processor of a computer device to cause the computer device to reduce a size of the 3D digital supplemented tooth model by a pre-defined amount. The amount of the size reduction satisfies a restoration material depending minimum thickness required for a restoration material of the dental restoration element. An output with the reduced 3D digital supplemented tooth model is provided defining a preparation surface of the damaged tooth for receiving a dental restoration element.

In another aspect, the invention relates to a computer device for restoring a 3D digital defective tooth model of a tooth of a patient. The computer device comprises a processor and a memory storing program instructions executable by the processor. Execution of the program instructions by the processor causes the computer device to receive a 3D digital teeth model of at least a part of a dentition of a patient. The 3D digital teeth model comprises at least the 3D digital defective tooth model. A 3D digital supplemented tooth model of the tooth of the patient is generated. The generating of the 3D digital supplemented tooth model comprises supplementing the 3D digital defective tooth model with one or more filling tooth sections used to fill one or more of the missing tooth sections.

At least one of the one or more filling tooth sections used to supplement the 3D digital defective tooth model is provided using a 3D digital artificial tooth model of an artificial tooth. The supplementing of the filling tooth sections further comprises providing the 3D digital artificial tooth model. The 3D digital defective tooth model is overlaid with the 3D digital artificial tooth model. The 3D digital defective tooth model is merged with the 3D digital artificial tooth model by adding at least one tooth section of the 3D digital artificial tooth model missing in the 3D digital defective tooth model as the respective at least one filling tooth section to the 3D digital defective tooth model for generating the 3D digital supplemented tooth model.

The computer device may be configured for executing any of the aforementioned methods for restoring a 3D digital defective tooth model.

For example, the tooth of the patient is a tooth to be prepared for receiving a dental restoration element. The surface to be defined is a preparation surface. Execution of the program instructions by the processor further causes the computer device to reduce size of the 3D digital supplemented tooth model by a pre-defined amount. The amount of the size reduction satisfies a restoration material depending minimum thickness required for a restoration material of the dental restoration element. An output with the reduced 3D digital supplemented tooth model is provided defining a preparation surface of the damaged tooth for receiving a dental restoration element.

In another aspect, the invention relates to a manufacturing system comprising the computer device for receiving a dental restoration element. The surface to be defined is a preparation surface. The manufacturing system further comprises a manufacturing device configured to manufacture the dental restoration element. Execution of the program instructions by the processor further causes the computer device to control the manufacturing device to generate a 3D digital restoration model of the dental restoration element. The generating of the 3D digital restoration model comprises subtracting the reduced 3D digital supplemented tooth model from the 3D digital supplemented tooth model. The dental restoration element is manufactured using the 3D digital restoration model as template. The manufactured dental restoration element is a physical copy of the respective template.

The manufacturing system may be configured for manufacturing any of the aforementioned examples of a set of layer-specific molding matrices.

For example, the manufacturing device is one of the following: a machining device, a 3D printing device.

The above-described examples and embodiments may be combined freely as long as the combinations are not mutually exclusive.

In the following, embodiments of the invention are described in greater detail in which FIG. 1 shows an exemplary 3D digital teeth model comprising 3D digital defective tooth models;

In the following similar features are denoted by the same reference numerals.

Figure 1:
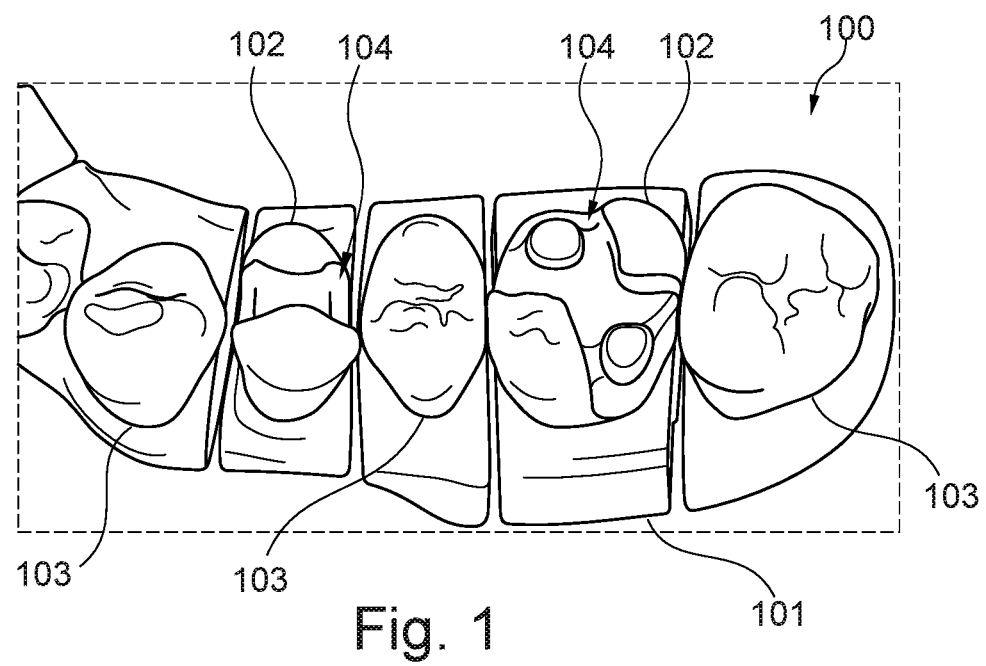

FIG. 1 shows an exemplary 3D digital teeth model 100 comprising a plurality of teeth. The exemplary 3D digital teeth model 100 comprises 3D digital defective tooth models 102. In FIG. 1, the exemplary 3D digital teeth model 100 is shown to comprise two 3D digital defective tooth models 102. An exemplary 3D digital teeth model 100 may in general comprise one or more 3D digital defective tooth models 102. In addition, the exemplary 3D digital teeth model 100 comprises 3D digital neighboring tooth model. The 3D digital teeth model 100 may, e.g., be a 3D digital model of a maxillary and/or mandibular tooth arch of a patient. In case the 3D digital teeth model 100 comprises maxillary as well as mandibular teeth, it may comprise 3D digital teeth model of antagonists of the teeth resembled by the 3D digital defective tooth models 102.

The 3D digital teeth model 100 may be generated using scan data of the patient's oral cavity. For example, the patient's teeth in the oral cavity may be scanned using an intraoral scanner, e.g., an optical intraoral scanner. The achieved scan data may be used to provide the 3D digital teeth model 100 of the scanned teeth of the oral cavity. Alternatively, an impression of the patient's teeth in the oral cavity, i.e., a negative imprint of the teeth may be taken. Either this impression may be scanned, e.g., using an optical scanner, or the negative imprint provided by the impression may be used to generate a positive reproduction of the patient's teeth, i.e., a 3D physical teeth model or cast, which is scanned, e.g., by the optical scanner to provide the scan data used to generate the 3D digital teeth model 100. The 3D digital teeth model 100 may, e.g., further comprise soft tissue, like a gingiva 101, in addition to the hard tissue in form of the teeth. Thus, the 3D digital teeth model 100 may, e.g., be provided in form of a 3D digital tissue model of at least a section of the patient's oral cavity.

The 3D digital defective tooth models 102 are missing tooth sections 104. Thus, the 3D digital defective tooth models 102 are a 3D digital models of teeth of the patient comprising defects in form of missing tooth sections 104. These defects may, e.g., be caused by defects of the physical teeth of the patient. For example, the respective teeth may be missing the same tooth sections. Alternatively or additionally, the defects may, e.g., be caused when generating the 3D digital defective tooth models 102, i.e., when transferring the physical features of the physical teeth to a 3D digital representation. For example, acquired scan data of the teeth may be incomplete resulting in 3D digital defective tooth models missing sections. The incompletion of the scan data may, e.g., be caused by an incomplete and/or erroneous scan.

Figure 2:
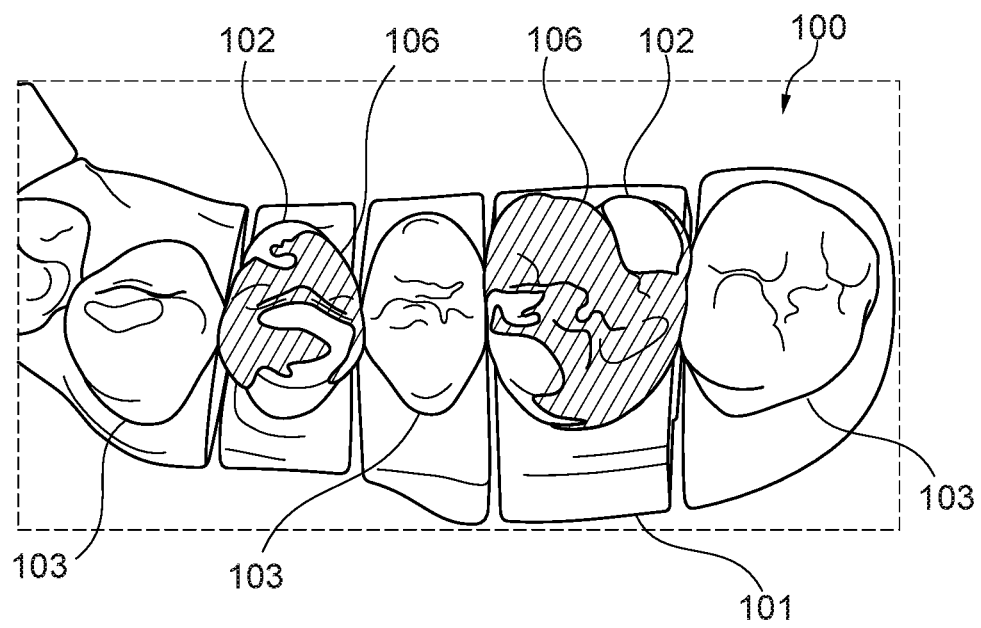
FIG. 2 shows the exemplary 3D digital teeth model of FIG. 1 with the 3D digital defective tooth models overlayed by 3D digital artificial tooth models.

FIG. 2 shows the exemplary 3D digital teeth model 100 of FIG. 1. The 3D digital defective tooth models 102 have each been overlayed by a 3D digital artificial tooth model 106. The 3D digital artificial tooth models 106 resemble library teeth and may be selected from a set of 3D digital artificial tooth models of library teeth. From the set of 3D digital artificial tooth models of library teeth, e.g., those 3D digital artificial tooth models 106 may be selected, which fits the anatomical and/or aesthetical characteristics of the patient's dentition best.

For example, one or more features of the 3D digital defective tooth models 102 may be used for selecting the 3D digital artificial tooth models 106. For example, one or more features of other 3D digital tooth models comprised by the 3D digital teeth model 100, like, e.g., of the 3D digital neighboring tooth models 103 and/or of 3D digital tooth models of antagonists of the 3D digital defective tooth models 102, may be used for selecting the 3D digital artificial tooth models 106. These features may be used as selection criteria for selecting the 3D digital artificial tooth models 106 from the set of 3D digital tooth models 106 of library teeth. Those 3D digital artificial tooth models 106 may be selected from the set of 3D digital tooth models 106 of library teeth, which best fit the selection criteria defined by the aforementioned features.

The features used for selecting the 3D digital artificial tooth models 106 may, e.g., comprise geometric features, like, e.g., size, form, proportions, surface structure. Furthermore, aesthetic features, like, e.g., color and/or degree of transparency, may be used for selecting the 3D digital artificial tooth models 106.

Figure 3:
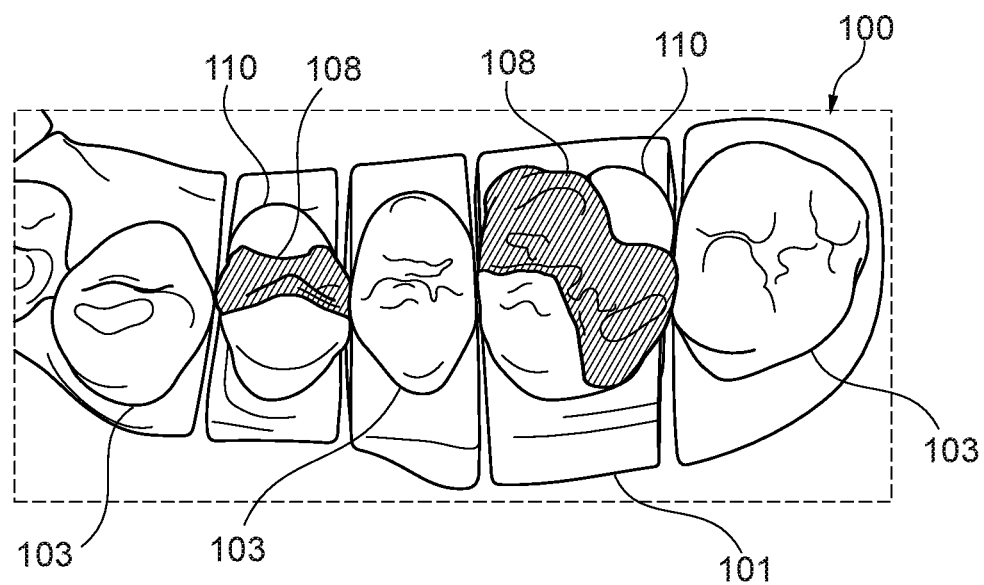
FIG. 3 shows the exemplary 3D digital teeth model of FIG. 1 with the 3D digital defective tooth models merged with the 3D digital artificial tooth model.

FIG. 3 shows the exemplary 3D digital teeth 100 model of FIG. 1. The missing tooth sections 104 of the 3D digital defective tooth models 102 as shown in FIG. 1 have been supplemented with filling tooth sections 108. The supplementing results in 3D digital supplemented tooth model 110. For generating the filling tooth sections 108, the 3D digital artificial tooth models 106 of FIG. 2 may be used. For example, the 3D digital defective tooth models 102 are merged with the 3D digital artificial tooth models 106 resulting in the 3D digital supplemented tooth models 110. The merging may comprise adding the filling tooth sections 108 provided by the 3D digital artificial tooth models 106, thereby filling missing tooth sections 104. The merging may comprise adapting the 3D digital artificial tooth models 106 and thus the filling tooth sections 108 comprised by the 3D digital artificial tooth models 106. The filling tooth sections 108 may be adapted to fit into and thus fill the missing tooth sections 104. For example, the merging may comprise adjusting the size of the 3D digital artificial tooth models 106 to match the size of the 3D digital defective tooth models 102. For this purpose, the size of the 3D digital artificial tooth models 106 may be scaled, e.g., up or down, to match the size of the 3D digital defective tooth models 102. In particular, the size of the 3D digital artificial tooth models 106 may be adapted to fit between the respective 3D digital neighboring tooth models 103. Furthermore, the filling tooth sections 108 may comprise occlusal surfaces. These occlusal surfaces of the 3D digital artificial tooth models 106 may further be adapted by adjusting an occlusion of the 3D digital artificial tooth models 106 overlaid over the 3D digital defective tooth models 102 and 3D digital antagonist models of the 3D digital defective tooth models 102 comprised by the 3D digital teeth model 100.

Figure 4:
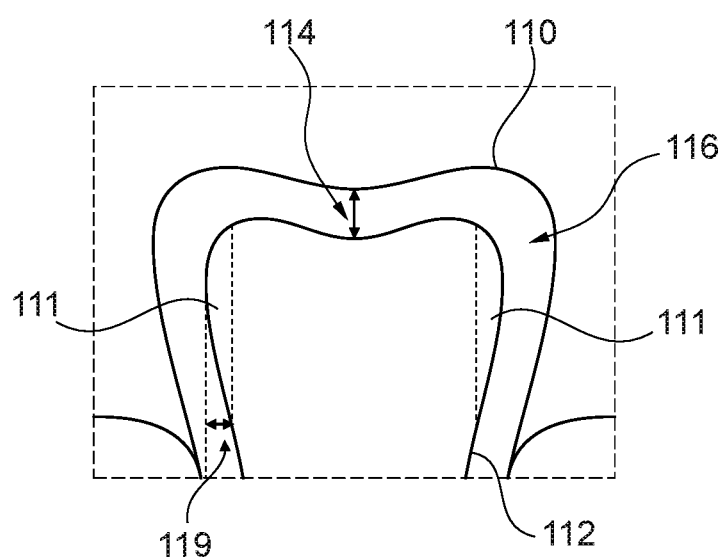
FIG. 4 shows a cross-sectional view of an exemplary reduction of a 3D digital supplemented tooth model.

FIG. 4 shows a cross-sectional view of a 3D digital supplemented tooth model 110. The 3D digital supplemented tooth model 110 results from supplementing a 3D digital defective tooth model with one or more filling tooth sections. These filling tooth sections are used to fill one or more of the missing tooth sections of the 3D digital defective tooth model. The 3D digital defective tooth model may, e.g., resemble a damaged tooth, which is missing the missing tooth sections. The 3D digital supplemented tooth model 110 may define a restored state of the damaged tooth, which is to be achieved using a, e.g., a dental restoration element. The 3D digital supplemented tooth model 110 is reduced by a pre-defined amount 114. The reduction results in reduced 3D digital supplemented tooth model 112. The reduced 3D digital supplemented tooth model 112 defines a preparation surface for the tooth of the patient, in order to prepare the respective tooth for receiving the dental restoration element. The difference between the 3D digital supplemented tooth model 110 and the reduced 3D digital supplemented tooth model 112 may define the dental restoration element. Thus, generating a 3D digital restoration model 116 may comprise subtracting the reduced 3D digital supplemented tooth model 112 from the 3D digital supplemented tooth model 110.

The amount 114 of the size reduction may satisfies a restoration material depending minimum thickness required for a restoration material of the dental restoration element. Reducing the size of the 3D digital supplemented tooth model 110 by an amount 114 at least equal to the restoration material depending minimum thickness may ensure a sufficient structural stability of the dental restoration element defined by the 3D digital restoration model 116. Furthermore, the amount 114 of the size reduction may be selected such that the dental restoration element satisfies a pre-defined color and/or a pre-defined degree of transparency to be achieved for the dental restoration element. For example, the amount may be equal or larger, e.g., slightly larger, than the restoration material depending minimum thickness. The amount may be larger taking further into account a surface morphology of the dental restoration element as defined by the 3D digital restoration model 116 and/or a layer of bonding material to be arranged between the dental restoration element defined by the 3D digital restoration model 116 and the prepared tooth defined by the reduced 3D digital supplemented tooth model 112.

The reduction may at least comprise the missing tooth sections of the damaged tooth digitally filled with filling tooth sections in order to define the 3D digital supplemented tooth model 110. For example, the amount 114 of reduction may be equal to or larger than a depth of the missing tooth sections.

On addition, e.g., lateral convex portions 111 of the reduced 3D digital supplemented tooth model 112 may be subtracted additionally after the size of the 3D digital supplemented tooth model 110 has been reduced by the pre-defined amount 114. The lateral convex portions 111 may, e.g., be subtracted circumferentially around the reduced 3D digital supplemented tooth model 112. For example, the lateral convex portions 111 may comprise one or more of the following: a mesial convex portion, a distal convex portion, a vestibular, e.g., labial or buccal, convex portion, an oral, e.g., lingual or palatal, convex portion. By subtracting the lateral convex portions 111, the shape of the reduced 3D digital supplemented tooth model 112 may be flattened in a direction from crown to root, thereby, e.g., improving the fitting of the dental restoration element onto the prepared tooth as defined by the reduced 3D digital supplemented tooth model 112 missing the subtracted convex portions 111. By subtracting lateral convex portions 111, undercuts 119 of the reduced 3D digital supplemented tooth model 112 may be reduced. By subtracting lateral convex portions, a tapering of the reduced 3D digital supplemented tooth model 112 towards the root of the tooth represented by the respective tooth model may be reduced.

Reducing undercuts 119 may have the beneficial effect, that a danger of food getting stuck in any gaps between the prepared tooth element represented reduced 3D digital supplemented tooth model 112 and the dental restoration element resulting from undercuts 119 of prepared tooth element may be reduced. A remaining, e.g., minimal, undercut may be desired, in case the dental restoration element should be fixated onto the prepared tooth element without using any bonding material, like dental cement. The remaining undercut may, e.g., establish a frictional connection, i.e., a frictional adhesion, between the prepared tooth element and the dental restoration element arranged thereon. The resulting frictional connection may, e.g., be a non-destructively detachable connection.

Alternatively, lateral convex portions may, e.g., be subtracted from the 3D digital supplemented tooth model 110 before the size of the 3D digital supplemented tooth model 110 is reduced by the pre-defined amount 114. Thus, the reduced 3D digital supplemented tooth model 112 resulting from reducing the size of the 3D digital supplemented tooth model 110 missing the subtracted lateral convex portions may as well not comprise the subtracted lateral convex portions.

Figure 5:
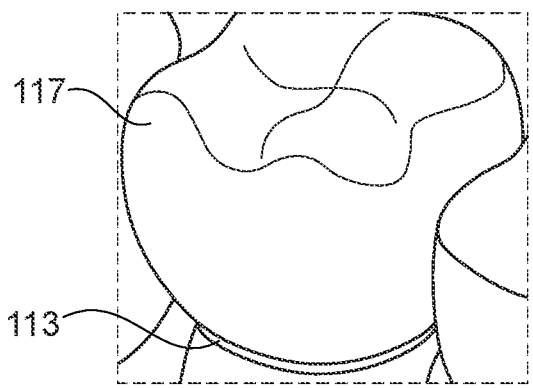
FIG. 5 shows an exemplary dental restoration element arranged on a prepared tooth.

FIG. 5 shows an exemplary dental restoration element 117 in form of a crown. The dental restoration element 117 may, e.g., be defined by the 3D digital restoration model 116 of FIG. 4. The dental restoration element 117 is arranged on a prepared tooth 113. The preparation of the prepared tooth 113 may, e.g., be defined by the reduced 3D digital supplemented tooth model 112 of FIG. 4.

Figure 6:
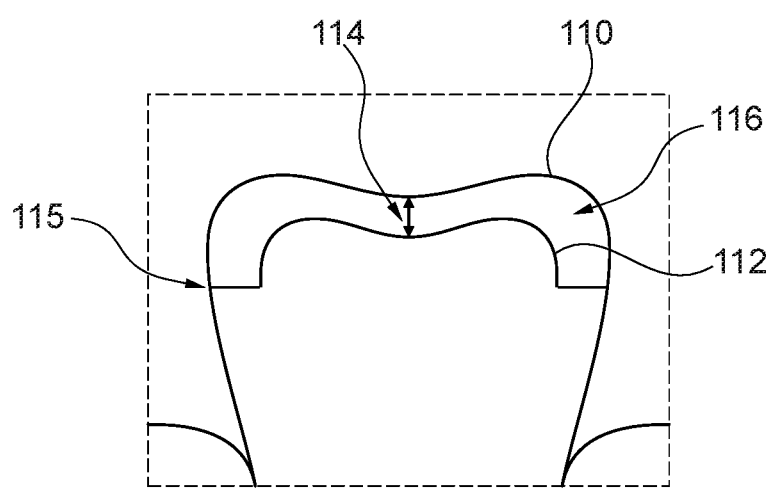
FIG. 6 shows a cross-sectional view of another exemplary reduction of a 3D digital supplemented tooth model.

FIG. 6 shows another exemplary reduction of a 3D digital supplemented tooth model 110. In case of the 3D digital supplemented tooth model 110 of FIG. 6, only a section of the 3D digital supplemented tooth model 110 is reduced in order to define a preparation of the respective damaged tooth. The reduction may at least comprise the missing tooth sections of the damaged tooth digitally filled with filling tooth sections in order to define 3D digital supplemented tooth model 110. For example, the amount 114 of reduction may be equal to or larger than a depth of the missing tooth sections.

The section of the 3D digital supplemented tooth model 110 to be reduced may be defined by a preparation line 115 limiting the respective section. Thus, the reducing of the size of the 3D digital supplemented tooth model 110 is limited to a reducing of the size of the section limited by the preparation line. This preparation line 115 defines the section of the damaged tooth to be prepared according to the reduced 3D digital supplemented tooth model 112 resulting from the reduction.

The reduced 3D digital supplemented tooth model 112 defines a preparation surface for the damaged tooth of the patient, in order to prepare the respective tooth for receiving the dental restoration element. The difference between the 3D digital supplemented tooth model 110 and the reduced 3D digital supplemented tooth model 112 may define the dental restoration element. Thus, generating a 3D digital restoration model 116 may comprise subtracting the reduced 3D digital supplemented tooth model 112 from the 3D digital supplemented tooth model 110.

The amount 114 of the size reduction may satisfies a restoration material depending minimum thickness required for a restoration material of the dental restoration element. Reducing the size of the 3D digital supplemented tooth model 110 by an amount 114 at least equal to the restoration material depending minimum thickness may ensure a sufficient structural stability of the dental restoration element defined by the 3D digital restoration model 116. Furthermore, the amount 114 of the size reduction may be selected such that the dental restoration element satisfies a pre-defined color and/or a pre-defined degree of transparency to be achieved for the dental restoration element. For example, the amount may be equal or larger, e.g., slightly larger, than the restoration material depending minimum thickness. The amount may be larger taking further into account a surface morphology of the dental restoration element as defined by the 3D digital restoration model 116 and/or a layer of bonding material to be arranged between the dental restoration element defined by the 3D digital restoration model 116 and the prepared tooth defined by the reduced 3D digital supplemented tooth model 112.

Figure 7:
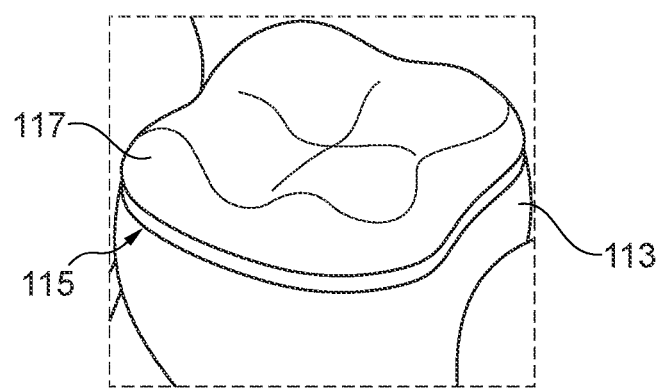
FIG. 7 shows another exemplary dental restoration element arranged on a prepared tooth.

FIG. 7 shows an exemplary dental restoration element 117 in form of a partial crown. The dental restoration element 117 may, e.g., be defined by the 3D digital restoration model 116 of FIG. 6. The dental restoration element 117 is arranged on a prepared tooth 113. The preparation of the prepared tooth 113 may, e.g., be defined by the reduced 3D digital supplemented tooth model 112 of FIG. 6.

Figure 8:
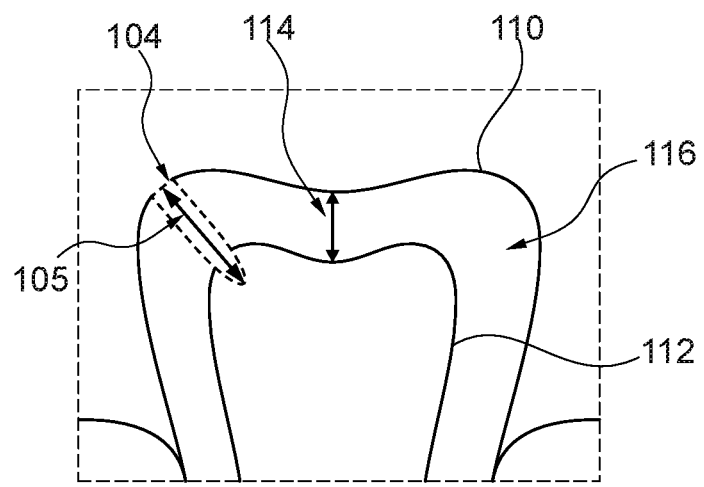
FIG. 8 shows a cross-sectional view of another exemplary reduction of a 3D digital supplemented tooth model.

FIG. 8 shows another exemplary reduction of a 3D digital supplemented tooth model 110. A missing tooth section 104 of the damaged tooth resembled by the 3D digital defective tooth model, e.g., in form of a hole in the damaged tooth, is indicated as well. A depth 105 of the missing tooth section 104 may be larger than the amount 114 of reduction. Depth 105 of the missing tooth section 104 may, e.g., be defined as an extension of the missing tooth section 104 perpendicular to the surface of the 3D digital supplemented tooth model 110 and/or as an extension of the missing tooth section 104 from the surface of the 3D digital supplemented tooth model 110 toward a center of the 3D digital supplemented tooth model 110. The amount 114 of reduction shown in FIG. 8 may be an amount equal to a pre-defined threshold. The pre-defined threshold may be defined in order to avoid removing to much tissue from the damaged tooth in order to prepare the tooth, when using the reduced 3D digital supplemented tooth model 112 as template.

The missing tooth section 104 shown in FIG. 8 extends into the reduced 3D digital supplemented tooth model 112. Thus, the reduced 3D digital supplemented tooth model 112 may be applied to the reduced 3D digital supplemented tooth model 112, i.e., the part of the missing tooth section 104 extending into the reduced 3D digital supplemented tooth model 112 may be removed, e.g., subtracted, from the 3D digital supplemented tooth model 112. For example, the part of the missing tooths section 104 removed from the reduced 3D digital supplemented tooth model 112 may further be smoothened by removing additional parts. The reduced 3D digital supplemented tooth model 112 with the remaining part of the missing tooths section additionally removed may be used as a template for preparing the damaged tooth. For defining the 3D digital restoration model 116 of the dental restoration element, the reduced 3D digital supplemented tooth model 112 with the remaining part of the missing tooths section additionally removed may be subtracted from the 3D digital supplemented tooth model 110. The resulting 3D digital restoration model 116 may define a dental restoration element configured to fill the missing tooth section 104 of damaged tooth prepared using the reduced 3D digital supplemented tooth model 112 with the remaining part of the missing tooths section additionally removed as a template.

On addition, e.g., lateral convex portions of the reduced 3D digital supplemented tooth model 112 may be subtracted additionally after the size of the 3D digital supplemented tooth model 110 has been reduced by the pre-defined amount 114. Alternatively, lateral convex portions may, e.g., be subtracted from the 3D digital supplemented tooth model 110 before the size of the 3D digital supplemented tooth model 110 is reduced by the pre-defined amount 114. Thus, the reduced 3D digital supplemented tooth model 112 resulting from reducing the size of the 3D digital supplemented tooth model 110 missing the subtracted lateral convex portions may as well not comprise the subtracted lateral convex portions.

Figure 9:
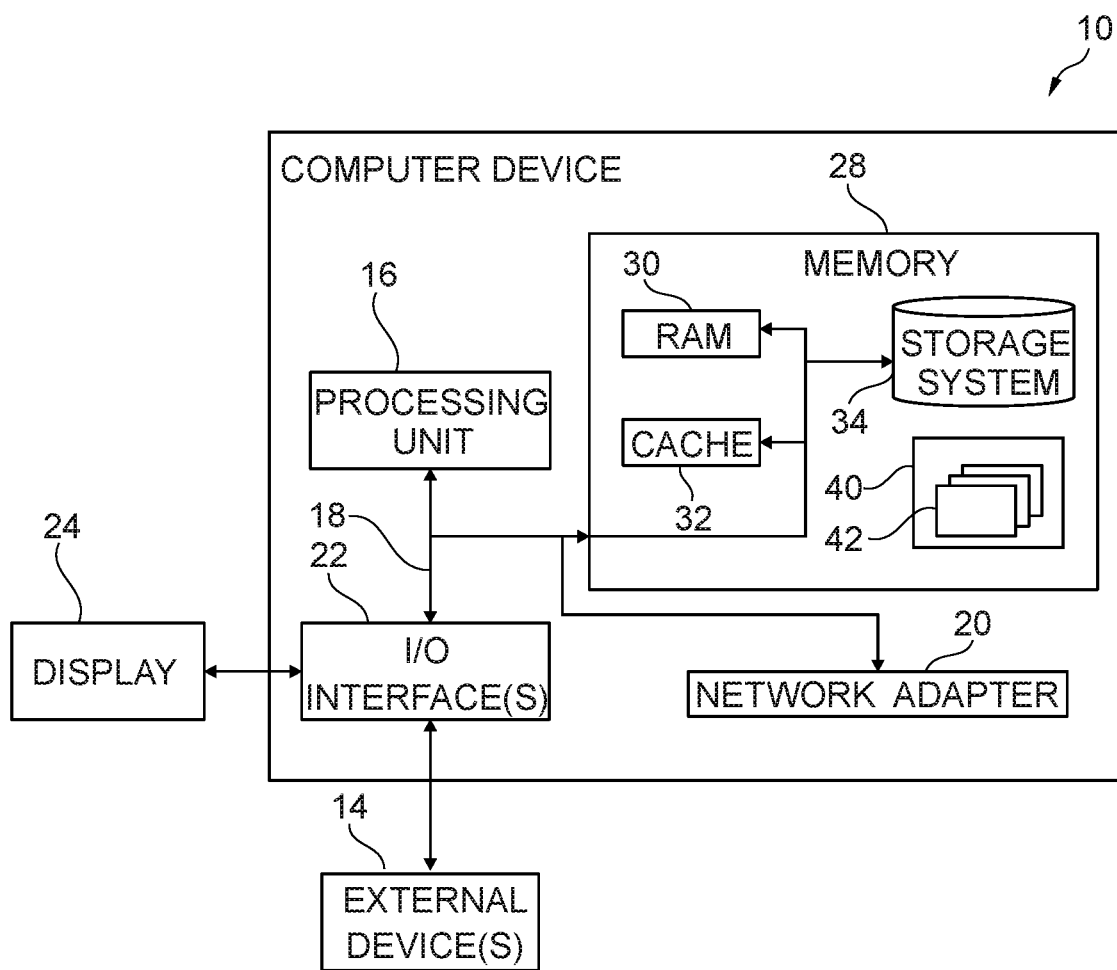
FIG. 9 shows an exemplary computer device for restoring a 3D digital defective tooth model of a tooth of a patient.

FIG. 9 shows a schematic diagram of an exemplary computer device 10 for restoring a 3D digital defective tooth model of a tooth of a patient. The computer device 10 may be operational with numerous other general-purpose or special-purpose computing system environments or configurations. Computer device 10 may be described in the general context of computer device executable instructions, such as program modules comprising executable program instructions, being executable by the computer device 10. Generally, program modules may include routines, programs, objects, components, logic, data structures, and so on that perform particular tasks or implement particular abstract data types. Computer device 10 may be practiced in distributed computing environments where tasks are performed by remote processing devices that are linked through a communications network. In a distributed computing environment, program modules may be located in both local and remote computer device storage media including memory storage devices.

In FIG. 9, computer device 10 is shown in the form of a general-purpose computing device. The components of computer device 10 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 10 may comprise a variety of computer device readable storage media. Such media may be any available storage media accessible by computer device 10, and include both volatile and non-volatile storage media, removable and non-removable storage media.

A system memory 28 may include computer device readable storage media in the form of volatile memory, such as random-access memory (RAM) 30 and/or cache memory 32. Computer device 10 may further include other removable/non-removable, volatile/non-volatile computer device storage media. For example, storage system 34 may be provided for reading from and writing to a non-removable, non-volatile magnetic media also referred to as a hard drive. For example, a magnetic disk drive for reading from and writing to a removable, non-volatile magnetic disk, e.g., a floppy disk, and an optical disk drive for reading from or writing to a removable, non-volatile optical disk such as a CD-ROM, DVD-ROM or other optical storage media may be provided. In such instances, each storage medium may be connected to bus 18 by one or more data media interfaces. Memory 28 may, e.g., include a 3D digital teeth model of a patient. The 3D digital teeth model may be received by the computer device 10. The 3D digital teeth model may comprise a 3D defective tooth model. Memory 28 may, e.g., include scan data of a patient's mouth from an intraoral scan or from a scan of a classical mold/impression, e.g., providing information about the surface structure of the patient's intraoral tissue comprising the one or more teeth to be reconstructed. The scan data may comprise scan data of tooth used for providing the 3D defective tooth model. Memory 28 may, e.g., include a set of 3D digital artificial tooth models of library teeth.

Memory 28 may, e.g., comprise a trained machine learning module trained for generating a 3D digital supplemented tooth model of the tooth of the patient. The trained machine learning module may be configured to provide the 3D digital supplemented tooth model as output in response to receiving the 3D digital defective tooth model as input. The trained machine learning module may, e.g., further be configured to receive a 3D digital artificial tooth model as input for generating the 3D digital supplemented tooth model of the tooth of the patient. Alternatively, the trained machine learning module may be provided with a set of 3D digital artificial tooth models of library teeth comprising a plurality of 3D digital artificial tooth model and trained to select one of these 3D digital artificial tooth to be used for supplementing the 3D digital defective tooth model and providing the resulting 3D digital supplemented tooth as output. For example, the trained machine learning module may be configured to receive the 3D digital defective tooth model as part of the 3D digital teeth model. The 3D digital teeth model may comprise one or more additional 3D digital tooth models of the denture of the patient. The trained machine learning module may be trained to take into account the additional 3D digital tooth models, like 3D digital tooth models of neighboring teeth and/or antagonists, for supplementing the 3D digital defective tooth model and providing the resulting 3D digital supplemented tooth as output. For example, the trained machine learning module may be configured for determining features of one or more additional 3D digital tooth models comprised by the 3D digital teeth model other than the 3D digital defective tooth model and use these features as selection criteria for selecting a 3D digital artificial tooth model from the set of 3D digital artificial tooth models of library teeth.

The trained machine learning module may, e.g., have been received by the computer device 10. The trained machine learning module may, e.g., have been trained by the computer device 10 using training datasets with training data received and/or generated by the computer device 10. For training the machine learning module, the memory 28 may comprise a machine learning module to be trained as well as training datasets with training data for training the machine learning module to be trained for generating the 3D digital restoration model. The machine learning module to be trained may, e.g., be an untrained machine learning module, a pre-trained machine learning module or a partially trained machine learning module.

Program 40 may have a set of one or more program modules 42 and by way of example be stored in memory 28. The program modules 42 may comprise an operating system, one or more application programs, other program modules, and/or program data. Each of the operating system, one or more application programs, other program modules, and program data or some combination thereof, may include an implementation of a networking environment. One or more of the program modules 42 may be configured for restoring a 3D digital defective tooth model and generate a 3D digital supplemented tooth model. One of the program modules 42 may, e.g., further be configured for generating a reduced 3D digital supplemented tooth model. One of the program modules 42 may, e.g., further be configured for generating a reduced 3D digital supplemented tooth model. One of the program modules 42 may, e.g., further be configured for generating a 3D digital restoration model. One of the program modules 42 may, e.g., be configured to use a trained machine learning module for generating the 3D digital supplemented tooth model. The trained machine learning module may be configured to provide the 3D digital supplemented tooth model as output in response to receiving the 3D digital defective tooth model as input. The trained machine learning module may, e.g., further be configured to receive a 3D digital artificial tooth model as input for generating the 3D digital supplemented tooth model of the tooth of the patient. Alternatively, the trained machine learning module may be provided with a set of 3D digital artificial tooth models of library teeth comprising a plurality of 3D digital artificial tooth model and trained to select one of these 3D digital artificial tooth to be used for supplementing the 3D digital defective tooth model and providing the resulting 3D digital supplemented tooth as output. For example, the trained machine learning module may be configured to receive the 3D digital defective tooth model as part of the 3D digital teeth model. The 3D digital teeth model may comprise one or more additional 3D digital tooth models of the denture of the patient. The trained machine learning module may be trained to take into account the additional 3D digital tooth models, like 3D digital tooth models of neighboring teeth and/or antagonists, for supplementing the 3D digital defective tooth model and providing the resulting 3D digital supplemented tooth as output. For example, the trained machine learning module may be configured for determining features of one or more additional 3D digital tooth models comprised by the 3D digital teeth model other than the 3D digital defective tooth model and use these features as selection criteria for selecting a 3D digital artificial tooth model from the set of 3D digital artificial tooth models of library teeth. One of the program modules 42 may, e.g., be configured to train a machine learning module to be trained to generate the 3D digital restoration model. The machine learning module to be trained may, e.g., be an untrained machine learning module, a pre-trained machine learning module or a partially trained machine learning module.

Computer device 10 may further communicate with one or more external devices 14 such as a keyboard, a pointing device, like a mouse, and a display 24 enabling a user to interact with computer device 10. Such communication can occur via input/output (I/O) interfaces 22. Computer device 10 may further communicate with one or more networks such as a local area network (LAN), a general wide area network (WAN), and/or a public network, like the Internet, via network adapter 20. Network adapter 20 may communicate with other components of computer device 10 via bus 18. It should be understood that although not shown, other hardware and/or software components could be used in conjunction with computer device 10.

The computer device 10 shown in FIG. 9 may be configured for restoring a 3D digital defective tooth model. The computer device 10 may be a standalone computer with no network connectivity that may receive data to be processed through a local interface. The data received by computer device 10 may for example comprise scan data of a patient's mouth from an intraoral scan or from a scan of a classical mold/impression, e.g., providing information about the surface structure of the patient's intraoral tissue comprising the tooth being resembled by the 3D digital defective tooth model. This data may be used to provide a 3D digital teeth model of the patient's oral cavity comprising the 3D digital defective tooth model. The defects of the 3D digital defective tooth model may resemble defects of the physical tooth resembled by the 3D digital defective tooth model. The defects of the 3D digital defective tooth model may be defects resulting from the generation of the 3D digital defective tooth model. For example, the defects may be defects of the scan data used to generate the 3D digital defective tooth model. Alternatively, the data received may, e.g., comprise the 3D digital teeth model.

The data received by computer device 10 may for example comprise a set of 3D digital artificial tooth models of library teeth. The data received by computer device 10 may for example comprise a trained machine learning module trained for generating a 3D digital supplemented tooth model of the tooth of the patient. The trained machine learning module may be configured to provide the 3D digital supplemented tooth model as output in response to receiving the 3D digital defective tooth model as input. The trained machine learning module may, e.g., further be configured to receive a 3D digital artificial tooth model as input for generating the 3D digital supplemented tooth model of the tooth of the patient. Alternatively, the trained machine learning module may be provided with a set of 3D digital artificial tooth models of library teeth comprising a plurality of 3D digital artificial tooth model and trained to select one of these 3D digital artificial tooth to be used for supplementing the 3D digital defective tooth model and providing the resulting 3D digital supplemented tooth as output. For example, the trained machine learning module may be configured to receive the 3D digital defective tooth model as part of the 3D digital teeth model. The 3D digital teeth model may comprise one or more additional 3D digital tooth models of the denture of the patient. The trained machine learning module may be trained to take into account the additional 3D digital tooth models, like 3D digital tooth models of neighboring teeth and/or antagonists, for supplementing the 3D digital defective tooth model and providing the resulting 3D digital supplemented tooth as output. For example, the trained machine learning module may be configured for determining features of one or more additional 3D digital tooth models comprised by the 3D digital teeth model other than the 3D digital defective tooth model and use these features as selection criteria for selecting a 3D digital artificial tooth model from the set of 3D digital artificial tooth models of library teeth.

The data received by computer device 10 may for example comprise a machine learning module to be trained. The machine learning module to be trained may, e.g., be an untrained machine learning module, a pre-trained machine learning module or a partially trained machine learning module. The data received by computer device 10 may for example comprise training datasets for training the machine learning module to be trained for generating the 3D digital restoration model. The computer device 10 may be used to generating a 3D digital restoration model as a template for manufacturing the dental restoration element. Such operation may, however, likewise be performed using a computer device that is connected to a network such as a communications network and/or a computing network.

Figure 10:
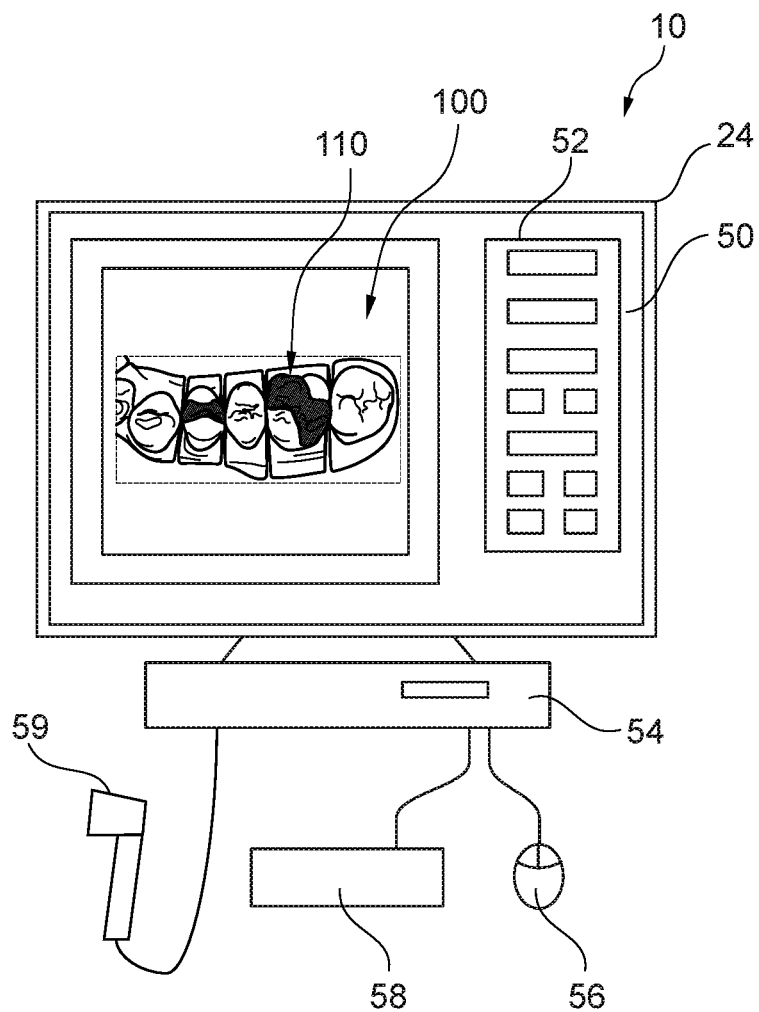
FIG. 10 shows an exemplary computer device for restoring a 3D digital defective tooth model of a tooth of a patient.

FIG. 10 shows an exemplary system computer device 10 for restoring a 3D digital defective tooth model. The computer device 10 may, e.g., be configured as shown in FIG. 9. The computer device 10 may comprise a hardware component 54 comprising one or more processors as well as a memory storing machine-executable program instructions. Execution of the program instructions by the one or more processors may cause the one or more processors to control the computer device 10 to restore 3D digital defective tooth model.

The computer device 10 may further comprise one or more input devices, like a keyboard 58 and a mouse 56, enabling a user to interact with the computer device 10. Furthermore, the computer device 10 may comprise one or more output devices, like a display 24 providing a graphical user interface 50 with control elements 52, e.g., GUI elements, enabling the user to control the restoring of the 3D digital defective tooth model. For restoring the 3D digital defective tooth model, a 3D digital teeth model 100 of at least a part of a dentition of a patient comprising the 3D digital defective tooth model may be received. A 3D digital supplemented tooth model 110 of the tooth of the patient is generated. The generating of the 3D digital supplemented tooth model 110 comprises supplementing the 3D digital defective tooth model with one or more filling tooth sections used to fill one or more of the missing tooth sections.

Furthermore, the control elements 52 may, e.g., be used to generate a reduced 3D digital supplemented tooth model and/or a 3D digital restoration model. The computer device 10 may further comprise a scanner 59, e.g., an optical scanner for scanning a patient's oral cavity, an imprint of a patient's oral cavity and/or a positive of a patient's oral cavity generated using an imprint.

Figure 11:
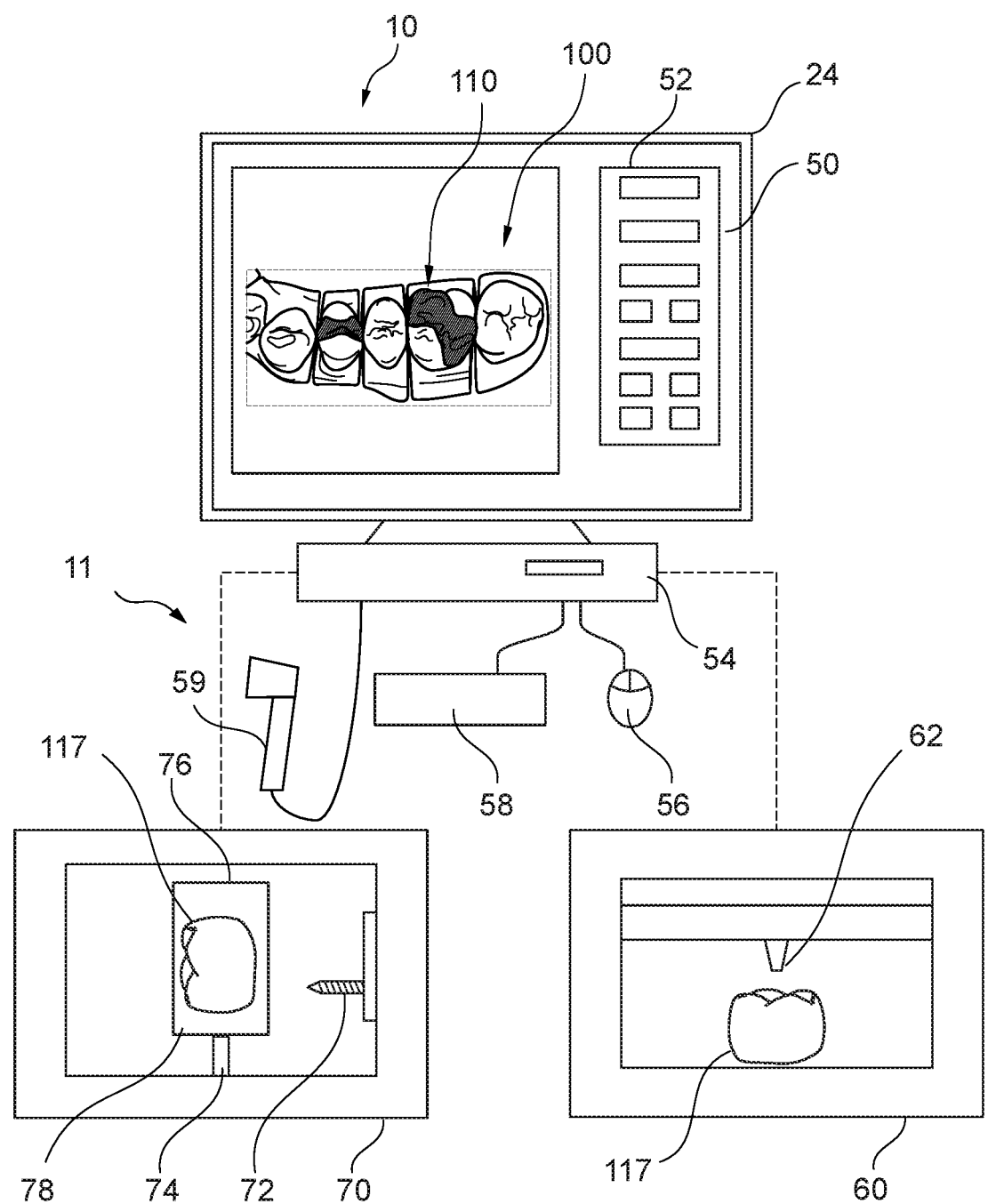
FIG. 11 shows an exemplary manufacturing system for manufacturing a dental restoration element.

FIG. 11 shows an exemplary manufacturing system 11 for manufacturing a dental restoration element 117 using a 3D digital restoration model as template. The manufactured dental restoration element 117 is a physical copy of the respective template. The generating of the 3D digital restoration model of the dental restoration element 117 may comprise subtracting the reduced 3D digital supplemented tooth model from the 3D digital supplemented tooth model 110.

The manufacturing system 11 may comprise the computer device 10 of FIG. 10. The computer device 10 may further be configured to generate the 3D digital restoration model of the dental restoration element 117 as well as to control one or more manufacturing devices 60, 70 to manufacture the dental restoration element 117. For example, the manufacturing system 11 may comprise a manufacturing device in form of a machining device 70 controlled by the computer device 10. The machining device 70 may be configured to machining a blank 76 of restoration material 78 using one or more machining tools 72. The blank 76 of restoration material 78, may be provided using a holding device 74 and cut into a desired shape and size of the element to be manufactured, e.g., a dental restoration element 117. The machining tool 72 may, e.g., be a milling tool. A 3D digital model, e.g., the 3D digital restoration model, may provide a template for the element being manufactured using the machining device 70, e.g., the dental restoration element 117.

For example, the manufacturing system 11 may comprise a manufacturing device in form of a 3D printing device 60. The 3D printing device 60 may be controlled by the computer device and configured to print an element to be manufactured, e.g., a dental restoration element 117. The 3D printing device 60 may comprise a printing element 62 configured to print the respective element, like the dental restoration element 117, layer by layer. The printing element 62 may, e.g., comprise a nozzle configured for distributing printing material, i.e., restoration material. A 3D digital model, e.g., the 3D digital restoration model, may provide a template of the physical element manufactured using the 3D printing device 60, e.g., the dental restoration element 117.

In case the dental restoration element 117 comprises metal sections, the 3D printing device 60 may, e.g., be used for executing selective laser sintering or melting. Selective laser sintering uses a laser for sintering a powdered material, aiming the laser automatically at points in space defined by a 3D digital model of the element to be printed. The laser energy may result in a local sintering or melting of the powdered material, binding the material together to create a solid structure. For example, the printing element 62 of the 3D printing device 60 may comprise a laser in addition to a distributing device for distributing the powdered material.

Figure 12:
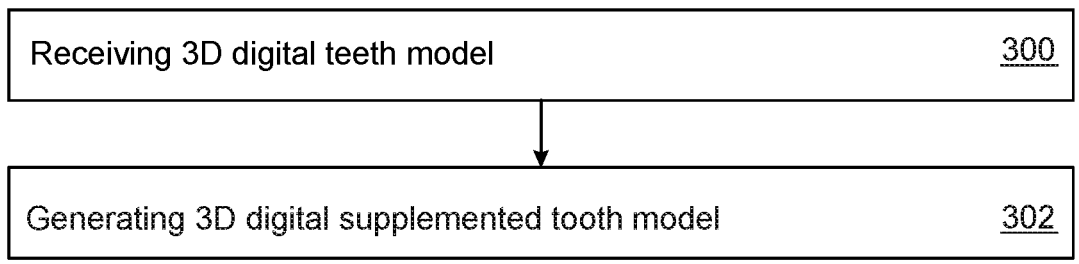
FIG. 12 shows a flowchart illustrating an exemplary method for generating a 3D digital supplemented tooth model.

FIG. 12 shows a flowchart illustrating an exemplary method for generating a 3D digital supplemented tooth model. The 3D digital supplemented tooth model is a digitally restored 3D digital defective tooth model.

In block 300, a 3D digital teeth model of at least a part of a dentition of a patient is received. The 3D digital teeth model comprises a 3D digital defective tooth model missing one or more tooth sections. The 3D digital teeth model with the 3D digital defective tooth model may, e.g., be generated using scan data of the patient's oral cavity. For example, the patient's teeth in the oral cavity may be scanned using an intraoral scanner, e.g., an optical intraoral scanner. The scan may comprise at least a part of the dentition of the patient, which comprises the respective tooth. For example, the upper and/or lower jaw, i.e., the mandibular dental arch and/or maxillary dental arch, are scanned. The achieved scan data may be used to provide the 3D digital teeth model of the scanned teeth of the oral cavity. Alternatively, an impression of the patient's teeth in the oral cavity, i.e., a negative imprint of the teeth may be taken. Either this impression may be scanned, e.g., using an optical scanner, or the negative imprint provided by the impression may be used to generate a positive reproduction of the patient's teeth, i.e., a 3D physical teeth model or cast, which is scanned, e.g., by the optical scanner to provide the scan data used to generate the 3D digital teeth model.

The 3D digital defective tooth model is a 3D digital model of a tooth of the patient. The tooth may be a damaged tooth comprising defects in form of missing tooth sections. Alternatively or additionally, the defects of the 3D digital defective tooth model may, e.g., be caused when generating the 3D digital defective tooth model, i.e., when transferring the physical tooth to a 3D digital representation. For example, acquired scan data of the tooth may be incomplete resulting in a 3D digital defective tooth model missing one or more tooth sections. The incompletion of the scan data may, e.g., be caused by an incomplete and/or erroneous scan.

In block 302, a 3D digital supplemented tooth model of the tooth of the patient is generated. The generating of the 3D digital supplemented tooth model comprises supplementing the 3D digital defective tooth model with one or more filling tooth sections used to fill one or more of the missing tooth sections. The resulting 3D digital supplemented tooth model may correspond to a 3D digital model of the tooth under consideration without defects, i.e., without missing tooth sections. Thus, the resulting 3D digital supplemented tooth may, e.g., provide a corrected 3D digital model of the tooth in case of scan defects or a 3D digital model of the tooth in a restored form to be achieved using a dental restoration element in case of physical defects of the tooth.

Figure 13:
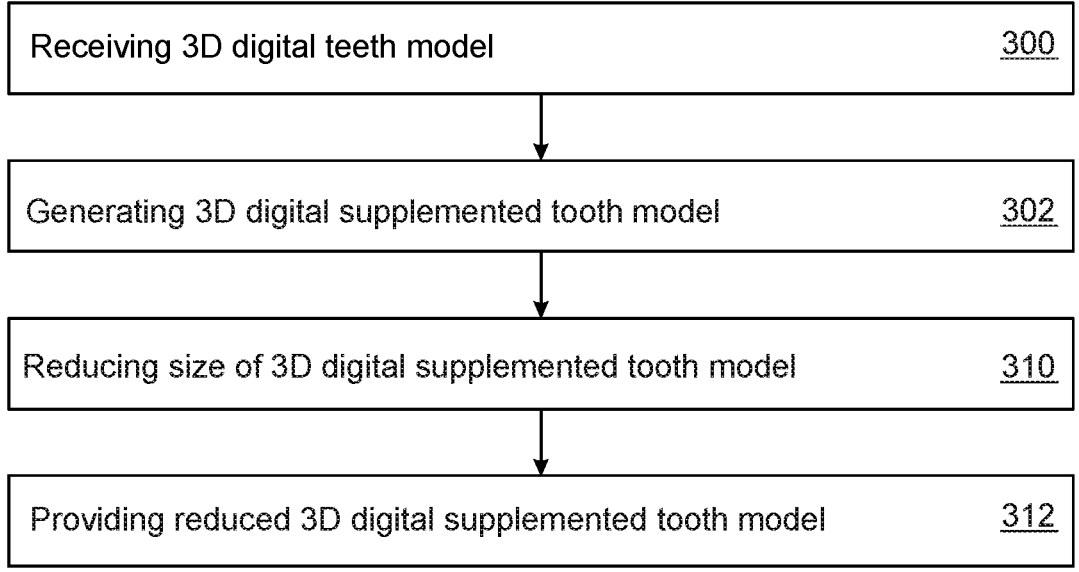
FIG. 13 shows a flowchart illustrating an exemplary method for generating a reduced 3D digital supplemented tooth model.

FIG. 13 shows a flowchart illustrating an exemplary method for generating a reduced 3D digital supplemented tooth model. In block 300, a 3D digital teeth model of at least a part of a dentition of a patient comprising a 3D digital defective tooth model is be received. The 3D digital defective tooth model is missing one or more tooth sections. The 3D digital defective tooth model is a 3D digital model of a tooth of the patient to be prepared for receiving a dental restoration element. In block 302, a 3D digital supplemented tooth model of the tooth of the patient is generated. The generating of the 3D digital supplemented tooth model comprises supplementing the 3D digital defective tooth model with one or more filling tooth sections used to fill one or more of the missing tooth sections.

In block 310, the size of the 3D digital supplemented tooth model is reduced by a pre-defined amount. The amount of the size reduction may satisfy a restoration material depending minimum thickness required for a restoration material of the dental restoration element. Reducing the size of the 3D digital supplemented tooth model by an amount at least equal to the restoration material depending minimum thickness may ensure a sufficient structural stability of the dental restoration element defined by a 3D digital restoration model. Furthermore, the amount of the size reduction may be selected such that the dental restoration element satisfies a pre-defined color and/or a pre-defined degree of transparency to be achieved for the dental restoration element. For example, the amount may be equal or larger, e.g., slightly larger, than the restoration material depending minimum thickness. The amount may be larger taking further into account a surface morphology of the dental restoration element as defined by the 3D digital restoration model and/or a layer of bonding material to be arranged between the dental restoration element defined by the 3D digital restoration model and the prepared tooth defined by the reduced 3D digital supplemented tooth model. The amount may, e.g., be selected to be large enough to cut of the filling tooth section of the 3D digital supplemented tooth model, i.e., the amount may be equal to or larger than a depth of the missing tooth section. The filling tooth section of the 3D digital supplemented tooth model may thus be fully comprised by the difference between the 3D digital supplemented tooth model and the reduced 3D digital supplemented tooth model. In this case, a preparation of the tooth using the reduced 3D digital supplemented tooth model as a template may result in a prepared tooth with all the missing tooth section cut off. Alternatively, if a depth of one or more of the missing tooth sections is larger than the amount, one or more parts of the filling tooth sections may not be cut off. In this case, a preparation of the tooth using the reduced 3D digital supplemented tooth model as a template may result in a prepared tooth with parts of the missing tooth sections not cut off. The dental restoration element defined by the 3D digital restoration model may be configured to additionally fill these remaining parts of the missing tooth sections.

In block 312, an output is provided with the reduced 3D digital supplemented tooth model. The reduced 3D digital supplemented tooth model defines a preparation surface for the tooth of the patient, in order to prepare the respective tooth for receiving the dental restoration element. The reduced 3D digital supplemented tooth model may be provided to be used as a template for preparing the tooth.

Figure 14:
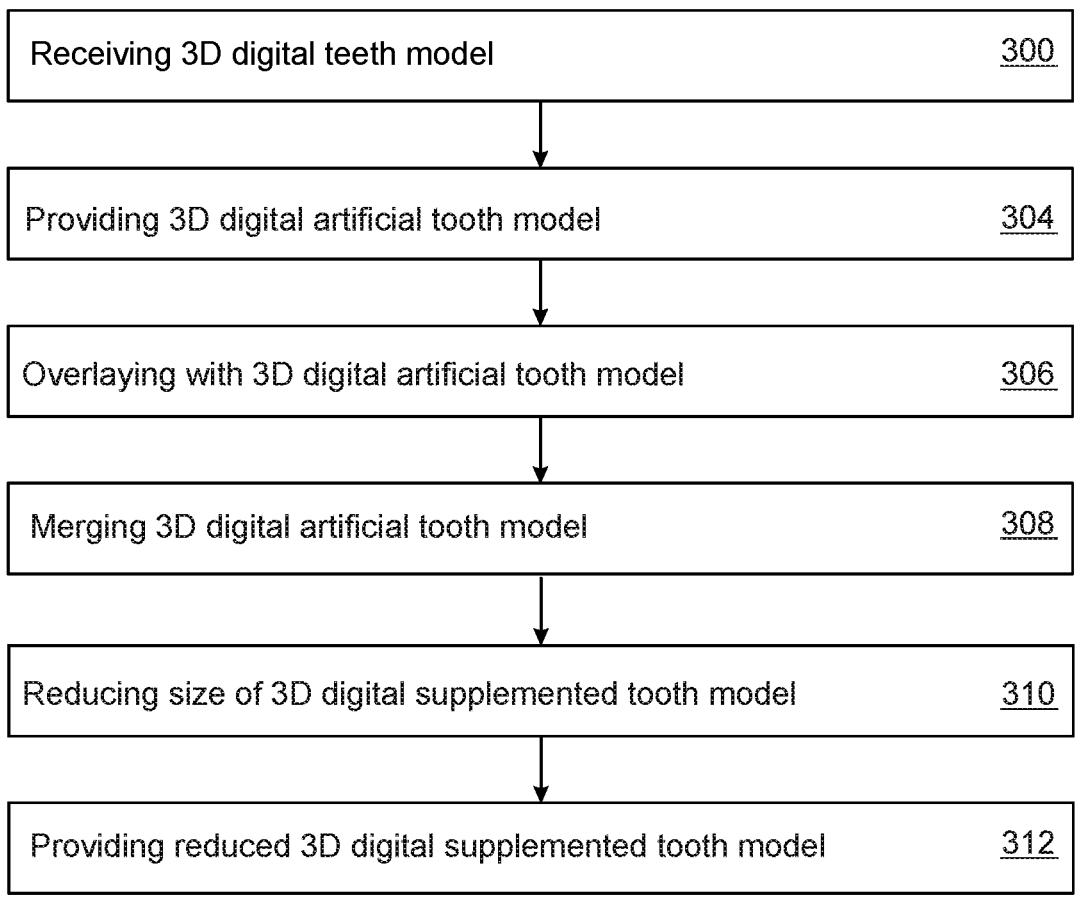
FIG. 14 shows a flowchart illustrating another exemplary method for generating a reduced 3D digital supplemented tooth model.

FIG. 14 shows a flowchart illustrating another exemplary method for generating a reduced 3D digital supplemented tooth model. In block 300, a 3D digital teeth model of at least a part of a dentition of a patient comprising a 3D digital defective tooth model is be received. The 3D digital defective tooth model is missing one or more tooth sections. The 3D digital defective tooth model is a 3D digital model of a tooth of the patient to be prepared for receiving a dental restoration element. In block 302, a 3D digital supplemented tooth model of the tooth of the patient is generated. The generating of the 3D digital supplemented tooth model comprises supplementing the 3D digital defective tooth model with one or more filling tooth sections used to fill one or more of the missing tooth sections.

In block 304, a 3D digital artificial tooth model is provided to be used for providing filling tooth sections to supplement the 3D digital defective tooth model. The 3D digital artificial tooth model may be a library tooth selected from a set of 3D digital artificial tooth models of library teeth. The 3D digital artificial tooth models selected may be a 3D digital artificial tooth model set of 3D digital tooth models, which fits the anatomical and/or aesthetical characteristics of the patient's dentition best. For example, one or more features of the 3D digital defective tooth model may be used for selecting the 3D digital artificial tooth model. For example, one or more features of other 3D digital tooth model comprised by the 3D digital teeth model, like, e.g., of the 3D digital neighboring tooth model and/or of 3D digital tooth model of antagonist of the 3D digital defective tooth model, may be used for selecting the 3D digital artificial tooth models. These features may be used as selection criteria for selecting the 3D digital artificial tooth model from the set of 3D digital artificial tooth models of library teeth. The 3D digital artificial tooth models 10 may be selected from the set of 3D digital artificial tooth models of library teeth, which best fits the selection criteria defined by the aforementioned features.

The features used for selecting the 3D digital artificial tooth model may, e.g., comprise geometric features, like, e.g., size, form, proportions, surface structure. Furthermore, aesthetic features, like, e.g., color and/or degree of transparency, may be used for selecting the 3D digital artificial tooth model.

In block 306, the 3D digital defective tooth model is overlaid with the 3D digital artificial tooth model. In block 308, the 3D digital defective tooth model is merged with the 3D digital artificial tooth model by adding one or more tooth sections of the 3D digital artificial tooth model missing in the 3D digital defective tooth model as the one or more filling tooth sections to the 3D digital defective tooth model resulting in the 3D digital supplemented tooth model.

The merging may comprise adapting the 3D digital artificial tooth model and thus the one or more filling tooth sections comprised by the 3D digital artificial tooth model. The filling tooth sections may be adapted to fit into and thus fill the missing tooth sections. For example, the merging may comprise adjusting the size of the 3D digital artificial tooth model to match the size of the 3D digital defective tooth model. For this purpose, the size of the 3D digital artificial tooth model may be scaled, e.g., up or down, to match the size of the 3D digital defective tooth mode. In particular, the size of the 3D digital artificial tooth model may be adapted to fit between the 3D digital neighboring tooth models resembling neighboring teeth of the tooth resembled by the 3D digital defective tooth model. Furthermore, the one or more filling tooth sections may comprise an occlusal surface. This occlusal surface of the 3D digital artificial tooth model may further be adapted by adjusting an occlusion of the 3D digital artificial tooth model overlaid over the 3D digital defective tooth models and a 3D digital antagonist model of an antagonist of the digital defective tooth models, e.g., provided by the 3D digital teeth model.

In block 310, the size of the 3D digital supplemented tooth model is reduced by a pre-defined amount. The amount of the size reduction may satisfy a restoration material depending minimum thickness required for a restoration material of the dental restoration element. Reducing the size of the 3D digital supplemented tooth model by an amount at least equal to the restoration material depending minimum thickness may ensure a sufficient structural stability of the dental restoration element defined by a 3D digital restoration model. Furthermore, the amount of the size reduction may be selected such that the dental restoration element satisfies a pre-defined color and/or a pre-defined degree of transparency to be achieved for the dental restoration element. For example, the amount may be equal or larger, e.g., slightly larger, than the restoration material depending minimum thickness. The amount may be larger taking further into account a surface morphology of the dental restoration element as defined by the 3D digital restoration model and/or a layer of bonding material to be arranged between the dental restoration element defined by the 3D digital restoration model and the prepared tooth defined by the reduced 3D digital supplemented tooth model. The amount may, e.g., be selected to be large enough to cut of the filling tooth section of the 3D digital supplemented tooth model, i.e., the amount may be equal to or larger than a depth of the missing tooth section. The filling tooth section of the 3D digital supplemented tooth model may thus be fully comprised by the difference between the 3D digital supplemented tooth model and the reduced 3D digital supplemented tooth model. In this case, a preparation of the tooth using the reduced 3D digital supplemented tooth model as a template may result in a prepared tooth with all the missing tooth section cut off. Alternatively, if a depth of one or more of the missing tooth sections is larger than the amount, one or more parts of the filling tooth sections may not be cut off. In this case, a preparation of the tooth using the reduced 3D digital supplemented tooth model as a template may result in a prepared tooth with parts of the missing tooth sections not cut off. The dental restoration element defined by the 3D digital restoration model may be configured to additionally fill these remaining parts of the missing tooth sections.

In block 312, an output is provided with the reduced 3D digital supplemented tooth model. The reduced 3D digital supplemented tooth model defines a preparation surface for the tooth of the patient, in order to prepare the respective tooth for receiving the dental restoration element. The reduced 3D digital supplemented tooth model may be provided to be used as a template for preparing the tooth.

Figure 15:
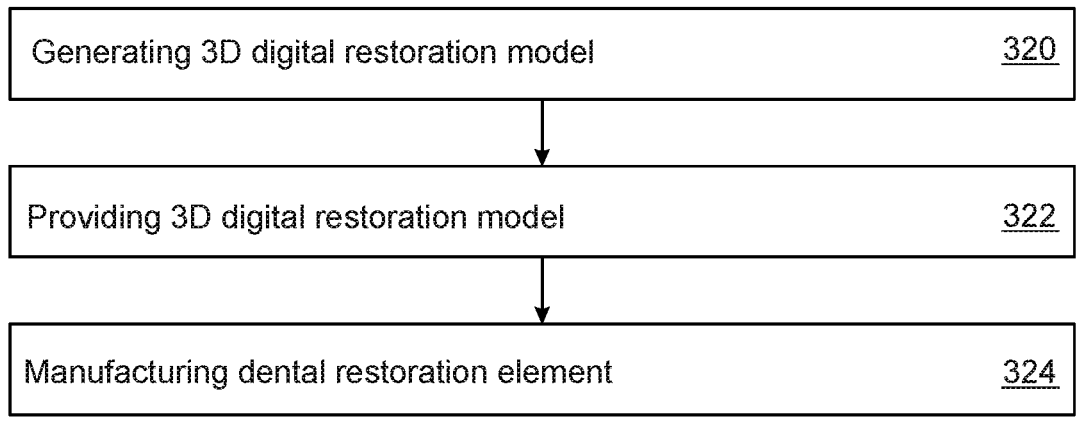
FIG. 15 shows a flowchart illustrating an exemplary method for manufacturing a dental restoration element.

FIG. 15 shows a flowchart illustrating an exemplary method for manufacturing a dental restoration element. In block 320, a 3D digital restoration model is generated as a template for manufacturing the dental restoration element. The generating of the 3D digital restoration model comprises subtracting the reduced 3D digital supplemented tooth model from the 3D digital supplemented tooth model. In block 322, the 3D digital restoration model is provided as a template for manufacturing the dental restoration element defined by the 3D digital restoration model.

In block 324, dental restoration element is manufactured using the 3D digital restoration model as a template. The manufactured dental restoration element may be a physical copy of the respective template. For example, the dental restoration element may be manufactured using a machining device configured to manufacture the dental restoration element by processing a blank of restoration material. For example, the dental restoration element may be manufactured using a 3D printing device, i.e., a printer, configured to print the dental restoration element. In case the dental restoration element comprises metal sections, a 3D printing device may, e.g., be used for executing selective laser sintering or melting. Selective laser sintering uses a laser for sintering a powdered material, aiming the laser automatically at points in space defined by a 3D digital model of the element to be printed. The laser energy may result in a local sintering or melting of the powdered material, binding the material together to create a solid structure. For example, a printing element of the 3D printing device may comprise a laser and/or a distributing device for distributing the powdered material.

For example, the 3D digital restoration model may be used as a positive to define a negative of the dental restoration element in form of a negative 3D digital restoration model. The negative 3D digital restoration model may be used to manufacture, e.g., using machining or 3D printing, a casting matrix. The casting matrix may be configured for casting the dental restoration element by inserting restoration material into the casting matrix and curing the inserted restoration material.

Figure 16:
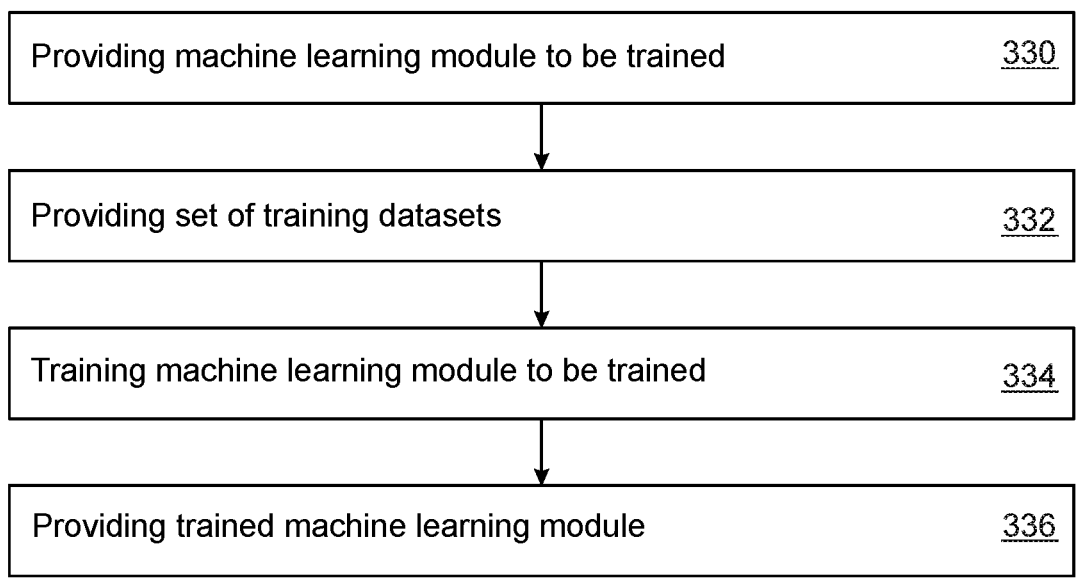
FIG. 16 shows a flowchart illustrating an exemplary method for training a machine learning module to be trained.

FIG. 16 shows a flowchart illustrating an exemplary method for training a machine learning module to be trained. The machine learning module to be trained may, e.g., be an untrained machine learning module, a pre-trained machine learning module or a partially trained machine learning module. The machine learning module to be trained is trained using the 3D digital training artificial tooth models to provide the 3D digital supplemented tooth model as output in response to receiving the 3D digital defective tooth model as input. In block 330, a machine learning module to be trained is provided. In block 332, a set of training datasets for training the machine learning module to be trained is provided. Each training dataset comprises a 3D digital training defective tooth model missing one or more tooth sections as well as a 3D digital training supplemented tooth model with one or more of the missing tooth sections of the 3D digital training defective tooth model of the respective training dataset being supplemented with one or more filling tooth sections. In addition, 3D digital training artificial tooth models are provided. For example, the 3D digital training artificial tooth models are comprised by the training datasets as additional input for training the machine learning module to be trained in combination with the 3D digital training defective tooth model of the respective training dataset. For example, the training datasets may comprise identifier identifying 3D digital artificial tooth models of a set of 3D digital artificial tooth models of library teeth as the 3D digital training artificial tooth models to be used for training the machine learning module to be trained. For example, the machine learning module to be trained may be trained to select a 3D digital artificial tooth model of the set of 3D digital artificial tooth models of library teeth as the 3D digital training artificial tooth model. In this case, the identifier of the 3D digital artificial tooth model is used as an output for training the machine learning module to be trained.

In block 334, the machine learning module to be trained provided in block 330 is trained using the set of training datasets provided in block 332. The machine learning module to be trained is trained to provide the 3D digital training supplemented models of the training datasets as an output in response to receiving the 3D digital training defective tooth models of the respective training datasets as input. In block 336, the trained machine learning module resulting from block 334 is provide. The trained machine learning module may be used to provide 3D digital supplemented tooth models as output in response to receiving 3D digital defective tooth models as input.

For example, the trained machine learning module may, e.g., be trained to provide the 3D digital supplemented tooth model in form of a reduced 3D digital supplemented tooth model and a 3D digital restoration model. For this purpose, the 3D digital training supplemented tooth models provided as training data by the training datasets may, e.g., be provided in form of split versions of 3D digital supplemented tooth models, i.e., as combinations of the reduced 3D digital training supplemented tooth models and 3D digital training restoration models. The 3D digital training restoration model may, e.g., correspond to a difference between the 3D digital training supplemented tooth model and the reduced 3D digital training supplemented tooth model. In addition, the training datasets may comprise a training identifier identifying a restoration material to be used for the dental restoration element and/or a restoration material depending minimum thickness. The machine learning module to be trained may be provided with a set of restoration material depending minimum thicknesses, each assigned to a restoration material of a plurality of restoration materials available for selection. The restoration material depending minimum thickness may be used for determining an amount of size reduction of the reduced 3D digital training restoration model relative to the 3D digital training restoration model, which defines the reduced 3D digital training restoration model.

For example, the training datasets in addition may each comprise a 3D digital training artificial tooth model as additional input for training the machine learning module to be trained in combination with the 3D digital training defective tooth model of the respective training dataset. Alternatively, the machine learning module to be trained may be provided with a set of 3D digital artificial tooth models of library teeth comprising a plurality of 3D digital artificial tooth model. Each training dataset may comprise an identifier identifying one of the 3D digital tooth models of the set of 3D digital artificial tooth models of library teeth to be used to for supplementing the 3D digital training defective tooth model and providing the resulting 3D digital training supplemented tooth as output. The machine learning module to be trained may thus be trained to select one of these 3D digital artificial tooth to be used for supplementing the 3D digital defective tooth model and providing the resulting 3D digital supplemented tooth as output.

For example, the training datasets comprises the 3D digital training defective tooth models as parts of 3D digital training teeth models. The 3D digital training teeth model each comprises one or more teeth of a training denture in addition to the training damaged tooth. For example, the machine learning module to be trained may be trained for determining features of one or more additional 3D digital training tooth models comprised by the 3D digital training teeth model other than the 3D digital training defective tooth model and use these features as selection criteria for selecting a 3D digital artificial tooth model from the set of 3D digital artificial tooth models of library teeth.

For example, the one or more additional teeth of the 3D digital training teeth model of each of the training datasets may comprise at least one of the following: one or more 3D digital tooth models of training neighboring teeth of the 3D digital training defective tooth model of the respective training dataset, a 3D digital tooth model of a training antagonist of the 3D digital training defective tooth model of the respective training dataset.

Figure 17:
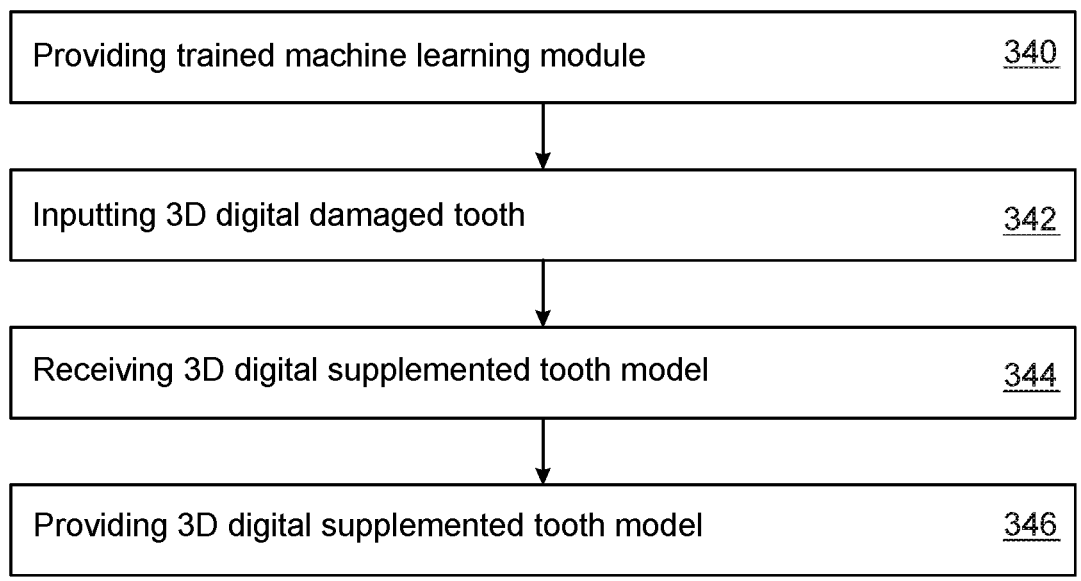
FIG. 17 shows a flowchart illustrating an exemplary method for using a trained machine learning module.

FIG. 17 shows a flowchart illustrating an exemplary method for using a trained machine learning module for generating a 3D digital supplemented tooth model. In block 340, the trained machine learning module is provided. The providing may, e.g., comprise a training of a machine learning module to be trained as shown in FIG. 17. The trained machine learning module may be configured using a 3D digital artificial tooth model to provide the 3D digital supplemented tooth model as output in response to receiving the 3D digital defective tooth model as input. In block 342, the 3D digital defective tooth model is input into the trained machine learning module. Thus, the trained machine learning module receives the 3D digital defective tooth model as input.

The 3D digital artificial tooth model used for generating the 3D digital supplemented tooth model may be provided as input as well, in order to provide the 3D digital supplemented tooth model as output. Alternatively, the trained machine learning module may receive an identifier as input identifying a 3D digital artificial tooth model of a set of 3D digital artificial tooth models of library teeth, to which the trained machine learning module has access. Alternatively, the trained machine learning module may be provided with a set of 3D digital artificial tooth models of library teeth comprising a plurality of 3D digital artificial tooth model and trained to select one of these 3D digital artificial tooth to be used for supplementing the 3D digital defective tooth model and providing the resulting 3D digital supplemented tooth as output.

In block 344, the 3D digital supplemented tooth model is received from the trained machine learning module as output in response to the inputting of the 3D digital defective tooth model. Thus, the trained machine learning module outputs the 3D digital supplemented tooth model in response to the receiving of the 3D digital defective tooth model. In block 346, the output 3D digital supplemented tooth model is provided. The 3D digital supplemented tooth model may, e.g., be used for defining a reduced 3D digital supplemented tooth model as a template for preparing the tooth resembled by the 3D digital defective tooth model. The 3D digital supplemented tooth model may, e.g., to generate a 3D digital restoration model defining a dental restoration element for restoring the tooth resembled by the 3D digital defective tooth model. Generating the 3D digital restoration model may, e.g., comprise subtracting the reduced 3D digital supplemented tooth model from the 3D digital supplemented tooth model.

In addition, an identifier identifying a restoration material to be used for the dental restoration element and/or a restoration material depending minimum thickness may be provided as input. The trained machine learning module may be provided with a set of restoration material depending minimum thicknesses, each assigned to a restoration material of a plurality of restoration materials available for selection, e.g., based on restoration material identifier. The restoration material depending minimum thickness may be taken into account by the machine learning module for determining an amount of size reduction of the reduced 3D digital restoration model relative to the 3D digital restoration model, in order to define the reduced 3D digital restoration model.

For example, the trained machine learning module may be configured to receive a 3D digital artificial tooth model as input in order to provide the 3D digital supplemented tooth model as output. Thus, the trained machine learning module may in addition use the 3D digital artificial tooth model to provide the 3D digital supplemented tooth model as output. Alternatively, the trained machine learning module may be provided with a set of 3D digital artificial tooth models of library teeth comprising a plurality of 3D digital artificial tooth model and trained to select one of these 3D digital artificial tooth to be used for supplementing the 3D digital defective tooth model and providing the resulting 3D digital supplemented tooth as output.

For example, the trained machine learning module may be configured to receive the 3D digital defective tooth model as part of the 3D digital teeth model. The 3D digital teeth model may comprise one or more additional 3D digital tooth models of the denture of the patient. For example, the trained machine learning module may be configured for determining features of one or more additional 3D digital tooth models comprised by the 3D digital teeth model other than the 3D digital defective tooth model and use these features as selection criteria for selecting a 3D digital artificial tooth model from the set of 3D digital artificial tooth models of library teeth. For example, the one or more additional 3D digital tooth models of the denture of the patient comprises at least one of the following: one or more 3D digital neighboring tooth models of the tooth of the patient, the 3D digital antagonist model of the tooth of the patient. Thus, features of one or more neighboring teeth and/or of the antagonist of the tooth of the patient may be taken into account.

Figure 18:
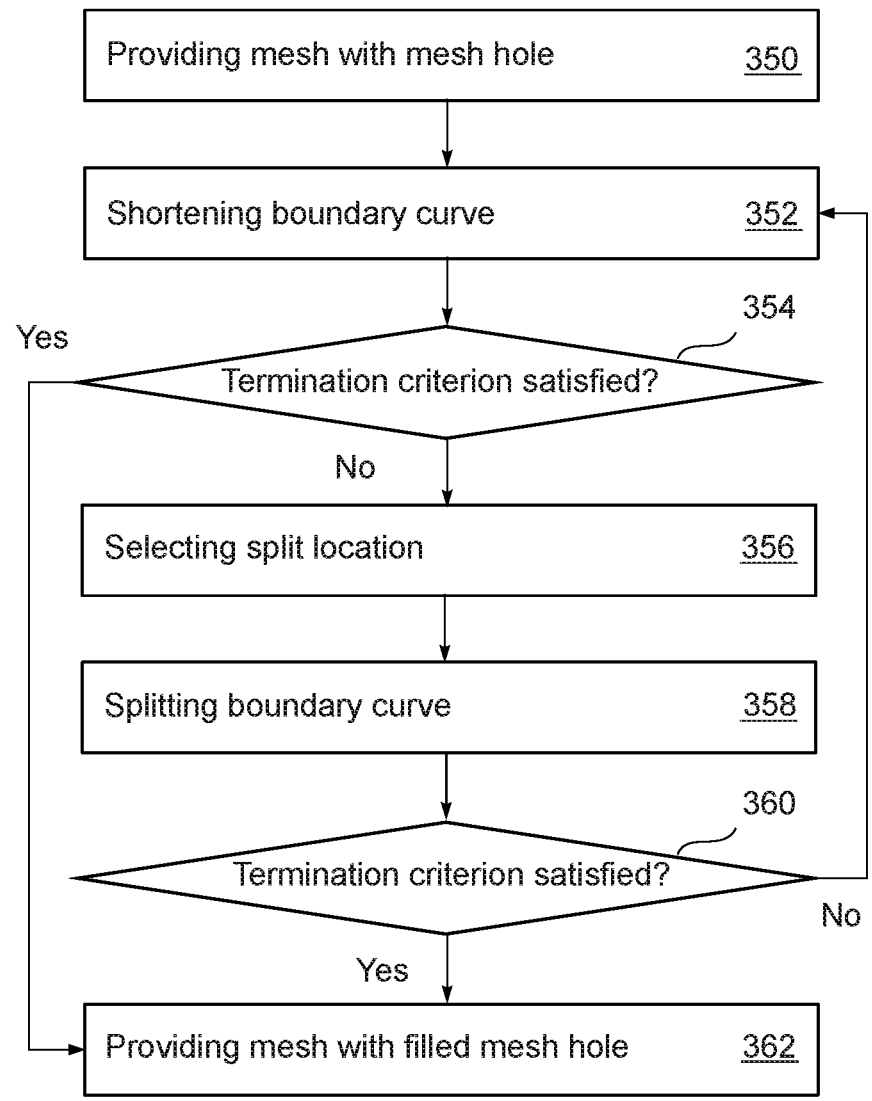
FIG. 18 shows a flowchart illustrating an exemplary method for filling a mesh hole.
Figure 19:
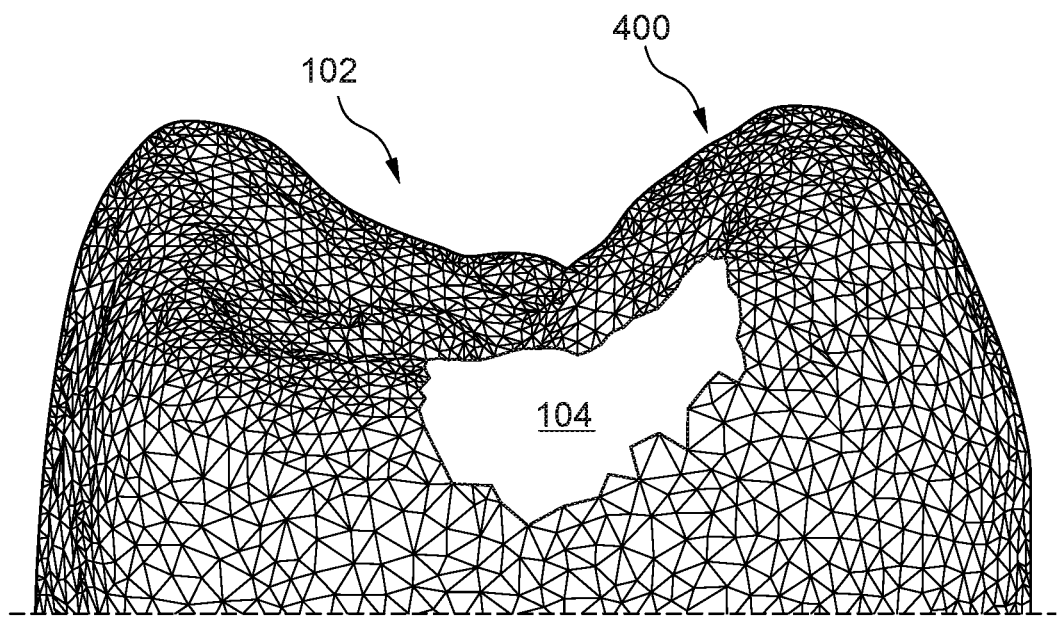
FIG. 19 shows an exemplary 3D digital defective tooth model.

FIG. 18 shows a flowchart illustrating an exemplary method for filling a missing tooth section in form of a mesh hole of a 3D digital defective tooth model defined by a 3D digital mesh. An exemplary 3D digital defective tooth model defined by a 3D digital mesh missing a tooth section in form of a mesh hole is shown in FIG. 19. A mesh filling algorithm for closing mesh holes in 3D digital meshes may be used to generate a filling tooth section to supplement the 3D digital defective tooth model and close the mesh hole. Such a mesh filling algorithm may, e.g., be used for closing mesh hole with a size up to a predefined threshold.

In block 350, the 3D digital defective tooth model defined by the 3D digital mesh comprising a mesh hole is provided. The 3D digital defective tooth model may, e.g., be the result of a reconstructed using a set of scan data acquired using a scanner, e.g., an optical scanner. The mesh may define a surface of the 3D digital defective tooth model. The mesh hole comprised by the 3D digital mesh may, e.g., result from missing scan data. Scan data used for providing the 3D digital defective tooth model may be incomplete, e.g., due to a partial obstruction of a view of the scanner during data acquisition. In this case, the 3D digital mesh may initially comprise the mesh hole. Alternatively, the mesh hole may result from a purposeful removal of a selected portion of the mesh. In this case, the mesh may initially be free of mesh holes and the mesh hole may be implemented as part of a processing of the 3D digital defective tooth model. Such a removal may be executed automatically, semiautomatically, or manually. Removing a portion of a mesh may for example be necessary in order to remove one or more scanning artifacts comprised by the respective portion. A boundary of the mesh hole may be defined by closed boundary curve.

In order to fill the mesh hole, a divide-and-conquer-approach may be used. The mesh hole is split by adding a connection curve. Along the connection curve additional boundary vertices may be added. The mesh holes resulting from splitting the preceding mesh hole may each be smaller than the preceding mesh hole, i.e., the boundary curves of the resulting mesh holes may each be smaller than the boundary curve of the preceding mesh hole in view of the number of boundary vertices comprised. This procedure may be applied recursively until all mesh holes are filled, e.g., no mesh holes comprising more than three boundary vertices remain.

In block 352, an optional preparation may be executed. In order to prepare the mesh hole for the splitting, the boundary curve of the mesh hole may be shortened. Thereby, the size of the boundary curve in terms of the number of boundary vertices comprised by the boundary curve may be reduced by one with each shortening. This shortening of the boundary curve may also be referred to as "ear cutting". Along the closed boundary curve, it may be searched for any three consecutive boundary vertices $v_{i-1}$, $v_i$ and $v_{i+1}$ defining an angle $\theta_i$ equal to or smaller than a predefined threshold $\theta_{thresh}$. The predefined threshold $\theta_{thresh}$, may for example be 75°, i.e., $\theta_{thresh}=75°$. The three consecutive boundary vertices may define a first boundary edge between $v_{i-1}$, and $v_i$ as well as a second boundary edge $v_i$ and $v_{i+1}$. Between these two boundary edges the angle $\theta_i$ is spanned. In case three consecutive boundary vertices $v_{i-1}$, $v_i$ and $v_{i+1}$ defining an angle equal to or smaller than the predefined threshold, i.e., $\theta_i \leq \theta_{thresh}$, are found, the boundary curve is shortened by inserting an additional boundary edge between the two outer boundary vertices $v_{i-1}$ and $v_{i+1}$. Inserting the additional boundary edge corresponds to the triangle $(v_{i-1}, v_i, v_{i+1})$. Upon inserting the additional boundary edge, the middle vertex $v_i$ is removed from the set of boundary vertices comprised by the boundary curve. As a result, the shortened boundary curve does not comprise the vertex $v_i$ anymore. The method may proceed with shortening the boundary curve 104 recursively, until no further triple of consecutive boundary vertices with an angle $\theta_k$ satisfying the predefined threshold $\theta_{thresh}$ can be found. For example, the aforementioned shortening may be used to add new triangles, i.e., additional boundary edges to the mesh. For example, the shortening may be the only way of adding new boundary edges to the mesh.

In block 354, it is checked, whether the mesh hole after shortening of the boundary curve already satisfies a termination criterion for terminating the filling. The termination criterion may be satisfied, in case the mesh hole is filled. The termination criterion may, e.g., require that all the boundary curves, i.e., the shortened boundary curves, comprise less than for four boundary vertices. For example, the shortened boundary curve may comprise three boundary vertices defining a triangle. In case the termination criterion is satisfied, the filling of the mesh hole is terminated and the mesh with the completely filled mesh hole is provided in block 362. In case the termination criterion is not satisfied, the method continues with block 356.

In block 356, a suitable location may be selected for splitting the mesh hole. For finding a suitable location, a maximized triple of boundary vertices comprising a first boundary vertex $v_i$, a second $v_j$ and a third boundary vertex $v_k$ is selected. The selected maximized triple satisfies the criterion, that the maximized angle is smaller than or equal to 90°. For such a selected maximized triple, the location for the splitting is defined by the first and second boundary vertices $v_i$, $v_j$ of the respective triplet.

The maximized triple is maximized by selecting for the given pair of the first and second boundary vertices $v_i$, $v_j$ a third boundary vertex $v_k$ such that a maximized angle between a first vector from the third boundary vertex $v_k$ to the first boundary vertex $v_i$, i.e., $(v_i - v_k)$, and a second vector from the third boundary vertex $v_k$ to the second boundary vertex $v_j$, i.e., $(v_j - v_k)$ is maximized compared to selecting any other boundary vertex of the boundary curve as the third boundary vertex. In other words, for each pair of boundary vertices, indicated by (i, j), comprised by the boundary curve a maximized triple of boundary vertices, indicated by (i, j, k), may be identified with a maximized angle $$\max_{k \neq i,j} \varphi_{i,j,k}$$

of the triangle $(v_i, v_j, v_k)$ at $v_k$, i.e., between the vectors $(v_i - v_k)$ and $(v_j - v_k)$. From the resulting plurality of maximized triples, i.e., for all pairs of boundary vertices, a maximized triple may be selected with the maximized angle $$\max_{k \neq i,j} \varphi_{i,j,k} \leq 90°.$$

For example, only triples may be taken into account, in which the first and second boundary vertices $v_i$, $v_j$ are connected by a single edge, i.e., with j=i±1. An additional criterion for selecting the maximized triple of boundary vertices may be that a distance between the first boundary vertex $v_i$ and the second boundary vertex $v_j$ of the selected maximized triple is a minimum distance compared to the distance of any other first and second boundary vertex of any other maximized triple of boundary vertices. An additional criterion for selecting the maximized triple of boundary vertices may be that the maximized angle between the first vector $(v_i - v_k)$ and the second vector $(v_j - v_k)$ of the selected maximized triple is a minimum $$\varphi_{i,j} = \max_{k \neq i,j} \varphi_{i,j,k}$$

compared to any other maximized angle between any other first and second vector of any other maximized triple.

In case no maximized triple satisfying the criterion, that the maximized angle is smaller than or equal to 90°, can be found, a maximized triple may be selected which comprises a maximized angle that is a minimum maximized angle compared to any other maximized angle of any other maximized triple. Thus, the maximized triple for which $$\varphi_{i,j} = \max_{k \neq i,j} \varphi_{i,j,k}$$

as minimum compared to any other maximized triple may be selected.

In block 358, the boundary curve is split using the split location selected in block 356. The selected split location is provided by the first and second boundary vertices $v_i$, $v_j$ of the selected maximized triple. These boundary vertices $v_i$, $v_j$ are connected using a connecting curve from the first to the second boundary vertex. The connecting curve c: $[0,1] \rightarrow \mathbb{R}^3$ added connects $v_i$ to $v_j$, i.e., $c(0)=v_i$ and $c(1)=v_j$. Furthermore, the connecting curve may be tangential to the existing mesh surface at its endpoints. This may be achieved by making it orthogonal to the surface normal vectors $n_i$ at $v_i$ and $n_j$ at $v_j$, i.e., $c'(0) \cdot n_i = 0$ and $c'(1) \cdot n_j = 0$. The splitting may further comprise adding one or more additional boundary vertices along the connecting curve. By adding additional boundary vertices, i.e., $w_1, \ldots, w_r$, the boundary curve comprising the boundary vertices $v_1, \ldots, v_m$ may be split into two boundary curves. A first one of the new boundary curves may comprise the boundary vertices $v_1, \ldots, v_i, w_1, \ldots, w_r, v_j, \ldots, v_m$, while a second one of the new boundary curves may comprise the boundary vertices $v_i, \ldots, v_j, w_r, \ldots, w_1$.

The positions of the additional boundary vertices $w_1, \ldots, w_r$, along the connecting curve may be chosen such that a distance between adjacent additional boundary vertices increases with an increasing distance from the boundary curve, i.e., from the closest one of boundary vertices $v_i$, $v_j$. In other words, the positions of the additional boundary vertices $w_1, \ldots, w_r$, along the connecting curve are chosen such that the lengths of the additional boundary edges defined by the additional vertices increase with increasing distance from the first closed boundary curve. Furthermore, a first length of a first additional edge connecting the first boundary vertex $v_i$ with a first additional boundary vertex $w_1$ may match a length of another boundary edge connecting the first boundary vertex $v_i$ with another boundary vertex of the boundary curve, i.e., $v_{i\pm1}$, or may match a first mean length calculated using edges connecting the first boundary vertex $v_i$ with other vertices. Alternatively, the first mean length may be calculated using the edge connecting the first boundary vertex of the selected maximized triple with an adjacent vertex which is no boundary vertex. Thus, e.g., any vertex adjacent the first boundary vertex of the selected maximized triple may be used for calculating the first mean length, regardless of whether the respective adjacent vertex is a boundary vertex or not. An adjacent vertex of the first boundary vertex of the selected maximized triple is a vertex, which is connected with the first boundary vertex of the selected maximized triple by a single edge.

A second length of a second additional edge connecting the second boundary vertex $v_j$ with a second additional boundary vertex $w_r$ may match a length of another boundary edge connecting the second boundary vertex $v_j$ with another boundary vertex of the boundary curve, i.e., $v_{j\pm1}$, or may match a second mean length calculated using edges connecting the second boundary vertex $v_j$ with other vertices. Alternatively, the second mean length may be calculated using the edge connecting the second boundary vertex of the selected maximized triple with an adjacent vertex which is no boundary vertex. Thus, e.g., any vertex adjacent the second boundary vertex of the selected maximized triple may be used for calculating the second mean length, regardless of whether the respective adjacent vertex is a boundary vertex or not. An adjacent vertex of the second boundary vertex of the selected maximized triple is a vertex, which is connected with the second boundary vertex of the selected maximized triple by a single edge.

Figure 20:
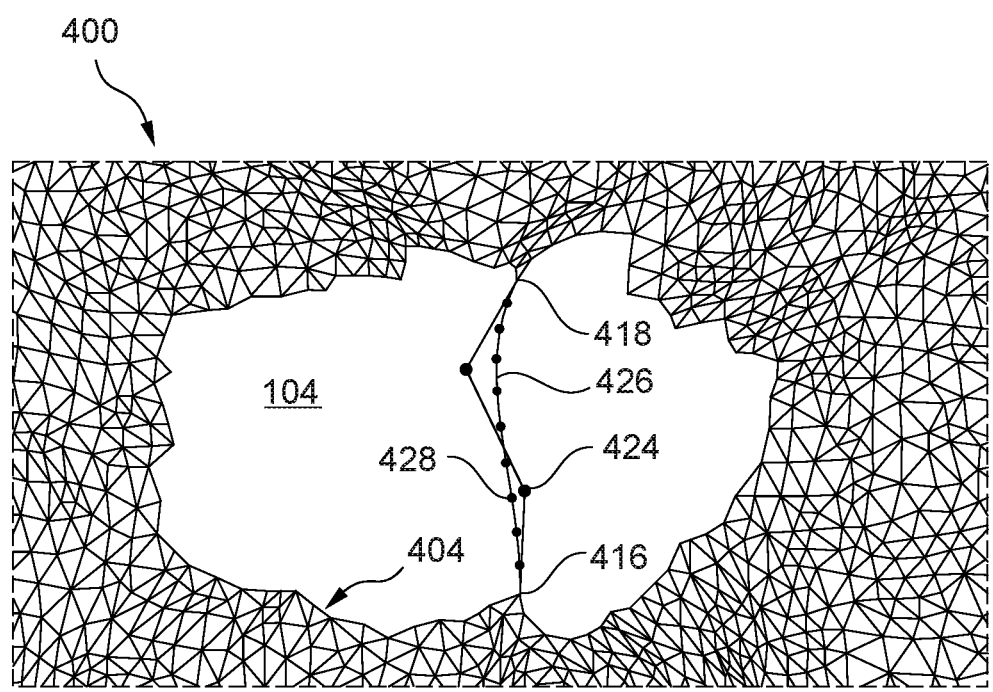
FIG. 20 shows an exemplary connection curve splitting a mesh hole.

The connecting curve may, e.g., be constructed as explained in detail in view of FIG. 20.

In block 360, it is checked, whether the mesh hole after the splitting of the boundary curve in block 358 satisfies the termination criterion for terminating the filling. In case the termination criterion is satisfied, the filling of the mesh hole is terminated and the mesh with the completely filled mesh hole is provided in block 362. In case the termination criterion is not satisfied, the method continues with block 352 for each of the meth holes resulting from the splitting the block 358. Thus, the filling may proceed recursively on the smaller boundary curves resulting from the splitting until the termination criterion is satisfied.

A resulting 3D digital supplemented tooth model comprising the mesh with the completely filled mesh hole may be provided in block 362 for further processing.

FIG. 19 shows an exemplary 3D digital defective tooth model 102 defined by a 3d digital mesh 400. The 3D digital defective tooth model 102 is missing a tooth section 104. The missing tooth section 104 may, e.g., be due to incomplete scan data used to generate the 3D digital defective tooth model 102.

FIG. 20 shows an exemplary connection curve 426 splitting a mesh hole 104. The exemplary connecting curve 426 is constructed from a first boundary vertex 416 to a second boundary vertex 418 of a selected maximized triple of boundary vertices. The connecting curve 426 used to connect the first and second boundary vertex 416, 418 in the example according to FIG. 20 is a cubic Bezier curve. For constructing a cubic Bezier curve four control points 424, i.e., $p_0, \ldots, p_3$ may be used. The first control point $p_0$ may be provided by the first boundary vertex 416, i.e., $p_0=v_i$. The fourth control point $p_3$ may be provided by the second boundary vertex 418, i.e., $p_3=v_j$. Then remaining two control points $p_1$ and $p_2$ may be defined as follows:

$$p_1 = v_i + \frac{1}{3}\vec{d}_i,$$

$$p_2 = v_j - \frac{1}{3}\vec{d}_j.$$

The vector $\vec{d}_{i,j}=v_j-v_i$ is the vector from the first boundary vertex $v_i$ 416 to the second boundary vertex $v_j$ 418. Using the vector $\vec{d}_{i,j}$ projections $\vec{d}_i$ and $\vec{d}_j$ of $\vec{d}_{i,j}$ into the tangential planes at $v_i$ and $v_j$, respectively, may be defined:

$$\vec{d}_i = \vec{d}_{i,j} - (\vec{d}_{i,j} \cdot n_i)n_i,$$

$$\vec{d}_j = \vec{d}_{i,j} - (\vec{d}_{i,j} \cdot n_j)n_j.$$

The projected vectors $\vec{d}_i$ and $\vec{d}_j$ may, e.g., be scaled to have the same length as $\vec{d}_{i,j}$.

Along the connecting curve 426 additional boundary vertices 428, i.e., Steiner vertices, may be added. By adding the additional boundary vertices 428, the connecting curve 426 is subdivided. For example, r additional boundary vertices 428, i.e., $w_1, \ldots, w_r$, may be added. The parameter r may, e.g., be chosen such that edge lengths at the beginning and end of the connecting curve 426 approximately match the lengths of edges at the boundary, i.e., at the first and second boundary vertices 416, 418. For example, the parameter r may be chosen such that the edge lengths at the beginning and end of the connecting curve 426 match an average length of the edges at the first and second boundary vertices 416 and 418, respectively. Furthermore, the parameter r may be limited such that the sizes of the resulting new boundary curves in terms of a number of vertices are smaller than the size of the boundary curve 404. A first one of the two new boundary curves may comprise the segment of boundary curve 404 from the first boundary vertex 416 to the second boundary vertex 418 as well as the connecting curve 426 from the second boundary vertex 418 to the first boundary vertex 416. A second one of the two new boundary curves may comprise the segment of boundary curve 404 from the second boundary vertex 418 to the first boundary vertex 416 as well as the connecting curve 426 from the first boundary vertex 416 to the second boundary vertex 418. By restricting the size of the connecting curve 426, i.e., the number of Steiner vertices added to the connecting curve 426, it may effectively be ensured that the method terminates. As long as the boundary curves resulting from a splitting are smaller than the preceding boundary curve being split, e.g., boundary curve 404, the method may, e.g., terminate, when all remaining boundary curves generated by splitting only comprise three boundary vertices, i.e., form triangles.

For example, a larger separation of the added vertices 428 may be chosen in the middle of the connecting curve 426 compared to the separation near the beginning of the connecting curve at the first boundary vertex 416 and the end of the connecting curve at the second boundary vertex 418. The distance between the added vertices 428 may, e.g., be the larger, the further away the respective vertices 428 are from the nearest end, i.e., vertex 416 or 418, of the boundary curve 426. For example, desired edge lengths a>0 and b>0 near the first and second vertices 418 and 416, respectively, may be defined. Furthermore, an incomplete curve parameter integral may be defined as $$I(x, y) := \int_0^x e^{\frac{\lambda(y-t)}{y} + \frac{\mu t}{y} + vt(y-t)} dt,$$

with $$\lambda := \log a,$$

$$\mu := \log b.$$

By adjusting the growth constant v≥0, it may be determined by how much edge lengths increase away from the boundary. It may hold that $$\frac{\partial I}{\partial x}(x, y)|_{x=0} = a,$$

$$\frac{\partial I}{\partial x}(x, y)|_{x=y} = b.$$

I(x, y) has a closed formed representation involving the error function. A complete curve parameter integral may be defined as I(y):=I(y, y). Since I(y)=0 and I'(y)>0, I(y) is increasing. In fact, if y>0, I(y) may be increasing rather fast. Hence for a given connecting curve length $\ell$ >0, a $\vec{y}$ >0 may be found such that I($\vec{y}$)= $\ell$ and $\vec{y}$ being small. The parameter r may, e.g., be chosen such that r≈$\vec{y}$−1 by rounding and bounding such that the resulting curves will be smaller than the original curve. A split vertex $w_k$ may be added at $$w_k = c\left(\frac{I(k, r+1)}{I(r+1)}\right).$$

In addition, new normal vectors may, e.g., be provided for the added boundary vertices $w_1, \ldots, w_r$. These new normal vectors may be computed by interpolating the normal vectors $n_i$ and $n_j$ at the first boundary vertex 416, i.e., $v_i$, and the second boundary vertex 418, i.e., $v_j$, and making them orthogonal to the connecting curve 426.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable signal medium or a computer readable storage medium. A "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. A further example of an optical disk may be a Blu-ray disk. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

"Computer memory" or "memory" is an example of a computer-readable storage medium. Computer memory is any memory which is directly accessible to a processor. "Computer storage" or "storage" is a further example of a computer-readable storage medium. Computer storage is any non-volatile computer-readable storage medium. In some embodiments, computer storage may also be computer memory or vice versa.

A "processor" as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer device or distributed amongst multiple computer devices. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities, the computer program or program instructions are understood to be adapted to be executed by a processor associated or related to the respective entity.

A "user interface" as used herein is an interface which allows a user or operator to interact with a computer or computer device. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, one or more switches, one or more buttons, and accelerometer are all examples of user interface components which enable the receiving of information or data from an operator.

A GUI element is a data object some of which's attributes specify the shape, layout and/or behavior of an area displayed on a graphical user interface, e.g., a screen. A GUI element can be a standard GUI element such as a button, a text box, a tab, an icon, a text field, a pane, a check-box item or item group or the like. A GUI element can likewise be an image, an alphanumeric character or any combination thereof. At least some of the properties of the displayed GUI elements depend on the data value aggregated on the group of data object said GUI element represents.

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Possible advantageous embodiments may comprise the following combinations of features:

1. A computer-implemented method for restoring a 3D digital defective tooth model of a tooth of a patient, the 3D digital defective tooth model being missing one or more tooth sections, the method comprising:

receiving a 3D digital teeth model of at least a part of a dentition of a patient, the 3D digital teeth model comprising at least the 3D digital defective tooth model, generating a 3D digital supplemented tooth model of the tooth of the patient, the generating of the 3D digital supplemented tooth model comprising supplementing the 3D digital defective tooth model with one or more filling tooth sections used to fill one or more of the missing tooth sections,
at least one of the one or more filling tooth sections used to supplement the 3D digital defective tooth model being provided using a 3D digital artificial tooth model of an artificial tooth, the supplementing of the filling tooth sections further comprising:
providing the 3D digital artificial tooth model,
overlaying the 3D digital defective tooth model with the 3D digital artificial tooth model,
merging the 3D digital defective tooth model with the 3D digital artificial tooth model by adding at least one tooth section of the 3D digital artificial tooth model missing in the 3D digital defective tooth model as the respective at least one filling tooth section to the 3D digital defective tooth model for generating the 3D digital supplemented tooth model.

2. The method of feature combination 1, the missing one or more tooth sections of the 3D digital defective tooth model resulting from one or more scan defects of a scan of the tooth of the patient.

3. The method of any of the preceding feature combinations, the 3D digital defective tooth model resembling the tooth of the patient, the tooth of the patient being a damaged tooth missing one or more tooth sections.

4. The method of any of the preceding feature combinations, the tooth of the patient being a tooth to be prepared for receiving a dental restoration element, the method further comprising:
reducing a size of the 3D digital supplemented tooth model by a pre-defined amount, the amount of the size reduction satisfying a restoration material depending minimum thickness required for a restoration material of the dental restoration element,
providing an output with the reduced 3D digital supplemented tooth model defining a preparation surface for the tooth of the patient for receiving the dental restoration element.

5. The method of feature combination 4, the size of the 3D digital supplemented tooth model being reduced using surface shrinking with the 3D digital supplemented tooth model being shrunk by the pre-defined amount.

6. The method of feature combination 5, the surface shrinking comprising a shrinking of the 3D digital supplemented tooth model, while preserving an anatomical form of the supplemented tooth model.

7. The method of any of feature combinations 4 to 6, the size of the 3D digital supplemented tooth model being reduced by subtracting the pre-defined amount from the 3D digital supplemented tooth model.

8. The method of any of feature combinations 4 to 7, the pre-defined amount of the size reduction further comprising one or more of the following: a depth of a surface morphology defined by the 3D digital supplemented tooth model, a thickness of a bonding material to be applied between the preparation surface defined by the reduced 3D digital supplemented tooth model and the dental restoration element.

9. The method of any of feature combinations 4 to 8, further comprising smoothing the preparation surface defined by the reduced 3D digital supplemented tooth model.

10. The method of any of feature combinations 4 to 9, the reducing of the size of the 3D digital supplemented tooth model further comprising subtracting one or more convex portions.

11. The method of any of the preceding feature combinations, the merging comprising adapting the one or more filling tooth sections of 3D digital artificial tooth model used to supplement the 3D digital defective tooth model to fit into and fill the one or more missing tooth sections of the 3D digital tooth model.

12. The method of any of the preceding feature combinations, the merging comprising adjusting the size of the 3D digital artificial tooth model to match the size of the 3D digital defective tooth model.

13. The method of feature combination 12, the size of the 3D digital artificial tooth model being adjusted using scaling.

14. The method of any of the preceding feature combinations, the one or more filling tooth sections of the 3D digital artificial tooth model used to supplement the 3D digital defective tooth model comprising at least a part of an occlusal surface of the 3D digital artificial tooth model, the 3D digital teeth model comprising a 3D digital antagonist model of an antagonist of the tooth of the patient, the merging comprising adjusting the occlusion of the 3D digital artificial tooth model using the 3D digital antagonist model.

15. The method of any of the preceding feature combinations, the artificial tooth being a library tooth, the providing of the 3D digital artificial tooth model comprising selecting the 3D digital artificial tooth model from a set of 3D digital artificial tooth models of library teeth.

16. The method of feature combination 15, the method comprising selecting one or more features of the 3D digital defective tooth model, using the one or more selected features as one or more selection criteria for selecting the 3D digital artificial tooth model from the set of 3D digital artificial tooth models of library teeth, a 3D digital tooth model of the set of 3D digital artificial tooth models of library teeth which best fits the one or more selection criteria being selected as the 3D digital artificial tooth model.

17. The method of feature combination 16, the one or more features comprising one or more of the following geometric features: size, form, proportions, surface structure.

18. The method of any of feature combinations 15 to 16, the method comprising selecting one or more additional features of one or more additional 3D digital tooth models comprised by the 3D digital teeth model other than the 3D digital defective tooth model, using the one or more additional features as one or more additional selection criteria for selecting the 3D digital artificial tooth model from the set of 3D digital artificial tooth models of library teeth.

19. The method of feature combination 18, the one or more additional features comprising one or more of the following geometric features: size, form, proportions, surface structure.

20. The method of any of feature combinations 18 to 19, the one or more additional 3D digital tooth models comprised by the 3D digital teeth model comprising at least one of the following: one or more 3D digital tooth models of neighboring teeth of the tooth of the patient, the 3D digital antagonist model of the tooth of the patient.

21. The method of any of the preceding feature combinations, using a trained machine learning module for generating the 3D digital supplemented tooth model of the tooth of the patient, the trained machine learning module being configured using the 3D digital artificial tooth model to provide the 3D digital supplemented tooth model as output in response to receiving the 3D digital defective tooth model as input.

22. The method of feature combination 21, the trained machine learning module being configured to receive the 3D digital artificial tooth model as input in order to provide the 3D digital supplemented tooth model as output.

23. The method of any of feature combinations 21 to 22, the trained machine learning module being configured to receive the 3D digital defective tooth model as part of the 3D digital teeth model, the 3D digital teeth model comprising one or more additional 3D digital tooth models of the denture of the patient.

24. The method of feature combination 23, the one or more additional 3D digital tooth models of the denture of the patient comprising at least one of the following: one or more 3D digital neighboring tooth models of the tooth of the patient, the 3D digital antagonist model of the tooth of the patient.

25. The method of any of feature combinations 21 to 24, further comprising providing the trained machine learning module, the providing of the trained machine learning module comprising:
providing a machine learning module to be trained,
providing a set of training datasets for training the machine learning module to be trained, each training dataset comprising a 3D digital training defective tooth model missing one or more tooth sections as well as a 3D digital training supplemented tooth model with one or more of the missing tooth sections of the 3D digital training defective tooth model of the respective training dataset being supplemented with one or more filling tooth sections,
providing 3D digital training artificial tooth models,
training the machine learning module to be trained using the 3D digital training artificial tooth models to provide the 3D digital training supplemented models of the training datasets as an output in response to receiving the 3D digital training defective tooth models of the respective training datasets as input.

26. The method of feature combination 25, the 3D digital training artificial tooth models being comprised by the training datasets as additional input for training the machine learning module to be trained in combination with the 3D digital training defective tooth model of the respective training dataset.

27. The method of any of feature combinations 25 to 26, the training datasets comprising the 3D digital training defective tooth models as parts of 3D digital training teeth models, the 3D digital training teeth model each comprising one or more teeth of a training denture in addition to the training damaged tooth.

28. The method of feature combination 27, the one or more additional teeth of the 3D digital training teeth model of each of the training datasets comprising at least one of the following: one or more 3D digital tooth models of training neighboring teeth of the 3D digital training defective tooth model of the respective training dataset, a 3D digital tooth model of a training antagonist of the 3D digital training defective tooth model of the respective training dataset.

29. The method of any of feature combinations 4 to 28, the restoration material depending minimum thickness being defined to ensure at least one of the following: a sufficient structural stability of the dental restoration element, a pre-defined color of the dental restoration element, a pre-defined transparency of the dental restoration element.

30. The method of any of feature combinations 4 to 29, the pre-defined amount being larger than the restoration material depending minimum thickness by an additional amount, if a depth of the one or more missing tooth sections is larger than the restoration material depending minimum thickness, the additional amount being selected to cut off the one or more filling tooth sections used to fill the one or more missing tooth sections.

31. The method of any of feature combinations 4 to 30, further comprising defining a preparation line limiting a section of the damaged tooth to be prepared to receive the dental restoration element, the reducing of the size of the 3D digital supplemented tooth model being limited to a reducing of the size of the section of the damaged tooth to be prepared and limited by the preparation line.

32. The method of any of feature combinations 4 to 31, the dental restoration element being one of the following: a crown, an inlay, an onlay, an overlay.

33. The method of any of feature combinations 4 to 32, further comprising generating a 3D digital restoration model of the dental restoration element, the generating of the 3D digital restoration model comprising subtracting the reduced 3D digital supplemented tooth model from the 3D digital supplemented tooth model.

34. The method of feature combination 33, further comprising manufacturing the dental restoration element using the 3D digital restoration model as template, the manufactured dental restoration element being a physical copy of the respective template.

35. The method of feature combination 34, the restoration element being manufactured using one of the following: machining, 3D printing, casting.

36. A computer program product for restoring a 3D digital defective tooth model of a tooth of a patient,
the computer program product comprising a computer readable storage medium having program instructions embodied therewith, the program instructions being executable by a processor of a computer device to cause the computer device to:
receive a 3D digital teeth model of at least a part of a dentition of a patient, the 3D digital teeth model comprising at least the 3D digital defective tooth model,
generate a 3D digital supplemented tooth model of the tooth of the patient, the generating of the 3D digital supplemented tooth model comprising supplementing the 3D digital defective tooth model with one or more filling tooth sections used to fill one or more of the missing tooth sections,
at least one of the one or more filling tooth sections used to supplement the 3D digital defective tooth model being provided using a 3D digital artificial tooth model of an artificial tooth, the supplementing of the filling tooth sections further comprising:
providing the 3D digital artificial tooth model,
overlaying the 3D digital defective tooth model with the 3D digital artificial tooth model,
merging the 3D digital defective tooth model with the 3D digital artificial tooth model by adding at least one tooth section of the 3D digital artificial tooth model missing in the 3D digital defective tooth model as the respective at least one filling tooth section to the 3D digital defective tooth model for generating the 3D digital supplemented tooth model.

37. The computer program product of feature combination 36, the tooth of the patient being a tooth to be prepared for receiving a dental restoration element, the program instructions further being executable by a processor of a computer device to cause the computer device to:
   reduce a size of the 3D digital supplemented tooth model by a pre-defined amount, the amount of the size reduction satisfying a restoration material depending minimum thickness required for a restoration material of the dental restoration element,
   provide an output with the reduced 3D digital supplemented tooth model defining a preparation surface of the damaged tooth for receiving a dental restoration element.

38. A computer device for restoring a 3D digital defective tooth model of a tooth of a patient,
   the computer device comprising a processor and a memory storing program instructions executable by the processor, execution of the program instructions by the processor causing the computer device to:
   receive a 3D digital teeth model of at least a part of a dentition of a patient, the 3D digital teeth model comprising at least the 3D digital defective tooth model,
   generate a 3D digital supplemented tooth model of the tooth of the patient, the generating of the 3D digital supplemented tooth model comprising supplementing the 3D digital defective tooth model with one or more filling tooth sections used to fill one or more of the missing tooth sections,
   at least one of the one or more filling tooth sections used to supplement the 3D digital defective tooth model being provided using a 3D digital artificial tooth model of an artificial tooth, the supplementing of the filling tooth sections further comprising:
   providing the 3D digital artificial tooth model,
   overlaying the 3D digital defective tooth model with the 3D digital artificial tooth model,
   merging the 3D digital defective tooth model with the 3D digital artificial tooth model by adding at least one tooth section of the 3D digital artificial tooth model missing in the 3D digital defective tooth model as the respective at least one filling tooth section to the 3D digital defective tooth model for generating the 3D digital supplemented tooth model.

39. The computer device of feature combination 38, the tooth of the patient being a tooth to be prepared for receiving a dental restoration element, execution of the program instructions by the processor further causing the computer device to:
   reduce size of the 3D digital supplemented tooth model by a pre-defined amount, the amount of the size reduction satisfying a restoration material depending minimum thickness required for a restoration material of the dental restoration element,
   provide an output with the reduced 3D digital supplemented tooth model defining a preparation surface of the damaged tooth for receiving a dental restoration element.

40. A manufacturing system comprising the computer device of feature combination 39, the manufacturing system further comprising a manufacturing device configured to manufacture the dental restoration element, execution of the program instructions by the processor further causing the computer device to control the manufacturing device to:
   generate a 3D digital restoration model of the dental restoration element, the generating of the 3D digital restoration model comprising subtracting the reduced 3D digital supplemented tooth model from the 3D digital supplemented tooth model,
   manufacture the dental restoration element using the 3D digital restoration model as template, the manufactured dental restoration element being a physical copy of the respective template.

41. The manufacturing system of feature combination 40, the manufacturing device being one of the following: a machining device, a 3D printing device.

LIST OF REFERENCE NUMERALS 10 computer device
11 manufacturing system
14 external device
16 processing unit
18 bus
20 network adapter
22 I/O interface
24 display
28 memory
30 RAM
32 cache
34 storage system
40 program
42 program module
50 user interface
52 control elements
54 hardware device
56 keyboard
58 mouse
59 scanner
60 3D printing device
62 printing element
70 machining device
72 machining tool
74 holding device
76 blank
78 restoration material
100 3D digital teeth model
102 3D digital defective tooth model
103 3D digital neighboring tooth model
104 missing tooth section
105 depth of tooth section
106 3D digital artificial tooth model
108 filling tooth section
110 3D digital supplemented tooth model
111 convex portion
112 reduced 3D digital supplemented tooth model
113 prepared tooth
114 amount of reduction
115 preparation line
116 3D digital restoration model
117 dental restoration element
119 undercut
400 3D digital mesh
404 boundary curve
416 first boundary vertex
418 second boundary vertex
424 control point
426 connecting curve
428 vertex

The invention claimed is:

1. A computer-implemented method for restoring a 3D digital defective tooth model of a tooth of a patient, the 3D digital defective tooth model missing one or more tooth sections,
the method comprising:
receiving a 3D digital teeth model of at least a part of a dentition of a patient, the 3D digital teeth model comprising at least the 3D digital defective tooth model, the 3D digital defective tooth model resembling the tooth of the patient, the tooth of the patient being a damaged tooth missing one or more tooth sections,
generating a 3D digital supplemented tooth model of the tooth of the patient, the generating of the 3D digital supplemented tooth model comprising supplementing the 3D digital defective tooth model with one or more filling tooth sections used to fill one or more of the missing tooth sections,
at least one of the one or more filling tooth sections used to supplement the 3D digital defective tooth model being provided using a 3D digital artificial tooth model of an artificial tooth different from the tooth of the patient, the supplementing of the filling tooth sections further comprising:
providing the 3D digital artificial tooth model,
overlaying the 3D digital defective tooth model with the 3D digital artificial tooth model,
merging the 3D digital defective tooth model with the 3D digital artificial tooth model by adding at least one tooth section of the 3D digital artificial tooth model missing in the 3D digital defective tooth model as the respective at least one filling tooth section to the 3D digital defective tooth model for generating the 3D digital supplemented tooth model,
wherein the merging comprises adapting the one or more filling tooth sections of the 3D digital artificial tooth model used to supplement the 3D digital defective tooth model to fit into and fill the one or more missing tooth sections of the 3D digital defective tooth model.

2. The method of claim 1, the tooth of the patient being a tooth to be prepared for receiving a dental restoration element, the method further comprising:
reducing a size of the 3D digital supplemented tooth model by a pre-defined amount, the amount of the size reduction satisfying a restoration material depending minimum thickness required for a restoration material of the dental restoration element,
providing an output with the reduced 3D digital supplemented tooth model defining a preparation surface for the tooth of the patient for receiving the dental restoration element.

3. The method of claim 2, the size of the 3D digital supplemented tooth model being reduced using surface shrinking with the 3D digital supplemented tooth model being shrunk by the pre-defined amount.

4. The method of claim 3, the surface shrinking comprising a shrinking of the 3D digital supplemented tooth model, while preserving an anatomical form of the supplemented tooth model.

5. The method of claim 2, the size of the 3D digital supplemented tooth model being reduced by subtracting the pre-defined amount from the 3D digital supplemented tooth model.

6. The method of claim 2, the pre-defined amount of the size reduction further comprising one or more of the following: a depth of a surface morphology defined by the 3D digital supplemented tooth model, a thickness of a bonding material to be applied between the preparation surface defined by the reduced 3D digital supplemented tooth model and the dental restoration element.

7. The method of claim 2, further comprising smoothing the preparation surface defined by the reduced 3D digital supplemented tooth model.

8. The method of claim 2, the reducing of the size of the 3D digital supplemented tooth model further comprising subtracting one or more convex portions.

9. The method of claim 1, the merging comprising adjusting the size of the 3D digital artificial tooth model to match the size of the 3D digital defective tooth model.

10. The method of claim 9, the size of the 3D digital artificial tooth model being adjusted using scaling.

11. The method of claim 1, the one or more filling tooth sections of the 3D digital artificial tooth model used to supplement the 3D digital defective tooth model comprising at least a part of an occlusal surface of the 3D digital artificial tooth model, the 3D digital teeth model comprising a 3D digital antagonist model of an antagonist of the tooth of the patient, the merging comprising adjusting the occlusion of the 3D digital artificial tooth model using the 3D digital antagonist model.

12. The method of claim 1, the artificial tooth being a library tooth, the providing of the 3D digital artificial tooth model comprising selecting the 3D digital artificial tooth model from a set of 3D digital artificial tooth models of library teeth.

13. The method of claim 12, the method comprising selecting one or more features of the 3D digital defective tooth model, using the one or more selected features as one or more selection criteria for selecting the 3D digital artificial tooth model from the set of 3D digital artificial tooth models of library teeth, a 3D digital tooth model of the set of 3D digital artificial tooth models of library teeth which best fits the one or more selection criteria being selected as the 3D digital artificial tooth model.

14. The method of claim 13, the one or more features comprising one or more of the following geometric features: size, form, proportions, surface structure.

15. The method of claim 12, the method comprising selecting one or more additional features of one or more additional 3D digital tooth models comprised by the 3D digital teeth model other than the 3D digital defective tooth model, using the one or more additional features as one or more additional selection criteria for selecting the 3D digital artificial tooth model from the set of 3D digital artificial tooth models of library teeth.

16. The method of claim 15, the one or more additional features comprising one or more of the following geometric features: size, form, proportions, surface structure.

17. The method of claim 15, the one or more additional 3D digital tooth models comprised by the 3D digital teeth model comprising at least one of the following: one or more 3D digital tooth models of neighboring teeth of the tooth of the patient, and a 3D digital antagonist model of the tooth of the patient.

18. The method of claim 1, using a trained machine learning module for generating the 3D digital supplemented tooth model of the tooth of the patient,
the trained machine learning module being configured using the 3D digital artificial tooth model to provide the 3D digital supplemented tooth model as output in response to receiving the 3D digital defective tooth model as input.

19. The method of claim 18, the trained machine learning module being configured to receive the 3D digital artificial tooth model as input in order to provide the 3D digital supplemented tooth model as output.

20. The method of claim 18, the trained machine learning module being configured to receive the 3D digital defective tooth model as part of the 3D digital teeth model, the 3D digital teeth model comprising one or more additional 3D digital tooth models of a denture of the patient.

21. The method of claim 20, the one or more additional 3D digital tooth models of the denture of the patient comprising at least one of the following: one or more 3D digital neighboring tooth models of the tooth of the patient, and a 3D digital antagonist model of the tooth of the patient.

22. The method of claim 18, further comprising providing the trained machine learning module, the providing of the trained machine learning module comprising:
providing a machine learning module to be trained,
providing a set of training datasets for training the machine learning module to be trained, each training dataset comprising a 3D digital training defective tooth model missing one or more tooth sections as well as a 3D digital training supplemented tooth model with one or more of the missing tooth sections of the 3D digital training defective tooth model of the respective training dataset being supplemented with one or more filling tooth sections,
providing 3D digital training artificial tooth models,
training the machine learning module to be trained using the 3D digital training artificial tooth models to provide the 3D digital training supplemented models of the training datasets as an output in response to receiving the 3D digital training defective tooth models of the respective training datasets as input.

23. The method of claim 22, the 3D digital training artificial tooth models being comprised by the training datasets as additional input for training the machine learning module to be trained in combination with the 3D digital training defective tooth model of the respective training dataset.

24. The method of claim 22, the training datasets comprising the 3D digital training defective tooth models as parts of 3D digital training teeth models, the 3D digital training teeth model each comprising one or more teeth of a training denture in addition to a training damaged tooth.

25. The method of claim 24, wherein one or more additional teeth of the 3D digital training teeth model of each of the training datasets comprises at least one of the following: one or more 3D digital tooth models of training neighboring teeth of the 3D digital training defective tooth model of the respective training dataset, a 3D digital tooth model of a training antagonist of the 3D digital training defective tooth model of the respective training dataset.

26. The method of claim 2, the restoration material depending minimum thickness being defined to ensure at least one of the following: a sufficient structural stability of the dental restoration element, a pre-defined color of the dental restoration element, a pre-defined transparency of the dental restoration element.

27. The method of claim 2, the pre-defined amount being larger than the restoration material depending minimum thickness by an additional amount, in response to a depth of the one or more missing tooth sections being larger than the restoration material depending minimum thickness, the additional amount being selected to cut off the one or more filling tooth sections used to fill the one or more missing tooth sections.

28. The method of claim 2, further comprising defining a preparation line limiting a section of the damaged tooth to be prepared to receive the dental restoration element, the reducing of the size of the 3D digital supplemented tooth model being limited to a reducing of the size of the section of the damaged tooth to be prepared and limited by the preparation line.

29. The method of claim 2, the dental restoration element being one of the following: a crown, an inlay, an onlay, an overlay.

30. The method of claim 2, further comprising generating a 3D digital restoration model of the dental restoration element, the generating of the 3D digital restoration model comprising subtracting the reduced 3D digital supplemented tooth model from the 3D digital supplemented tooth model.

31. The method of claim 30, further comprising manufacturing the dental restoration element using the 3D digital restoration model as template, the manufactured dental restoration element being a physical copy of the respective template.

32. The method of claim 31, the restoration element being manufactured using one of the following: machining, 3D printing, casting.

33. A computer program product for restoring a 3D digital defective tooth model of a tooth of a patient,
the computer program product comprising a non-transitory computer readable storage medium having program instructions embodied therewith, the program instructions being executable by a processor of a computer device to cause the computer device to:
receive a 3D digital teeth model of at least a part of a dentition of a patient, the 3D digital teeth model comprising at least the 3D digital defective tooth model, the 3D digital defective tooth model resembling the tooth of the patient, the tooth of the patient being a damaged tooth missing one or more tooth sections,
generate a 3D digital supplemented tooth model of the tooth of the patient, the generating of the 3D digital supplemented tooth model comprising supplementing the 3D digital defective tooth model with one or more filling tooth sections used to fill one or more of the missing tooth sections,
at least one of the one or more filling tooth sections used to supplement the 3D digital defective tooth model being provided using a 3D digital artificial tooth model of an artificial tooth different from the tooth of the patient, the supplementing of the filling tooth sections further comprising:
providing the 3D digital artificial tooth model,
overlaying the 3D digital defective tooth model with the 3D digital artificial tooth model,
merging the 3D digital defective tooth model with the 3D digital artificial tooth model by adding at least one tooth section of the 3D digital artificial tooth model missing in the 3D digital defective tooth model as the respective at least one filling tooth section to the 3D digital defective tooth model for generating the 3D digital supplemented tooth model,
wherein the merging comprises adapting the one or more filling tooth sections of the 3D digital artificial tooth model used to supplement the 3D digital defective tooth model to fit into and fill the one or more missing tooth sections of the 3D digital defective tooth model.

34. The computer program product of claim 33, the tooth of the patient being a tooth to be prepared for receiving a dental restoration element, the program instructions further being executable by a processor of a computer device to cause the computer device to:

reduce a size of the 3D digital supplemented tooth model by a pre-defined amount, the amount of the size reduction satisfying a restoration material depending minimum thickness required for a restoration material of the dental restoration element, provide an output with the reduced 3D digital supplemented tooth model defining a preparation surface of the damaged tooth for receiving a dental restoration element.

35. A computer device for restoring a 3D digital defective tooth model of a tooth of a patient, the computer device comprising a processor and a memory storing program instructions executable by the processor, execution of the program instructions by the processor causing the computer device to:

receive a 3D digital teeth model of at least a part of a dentition of a patient, the 3D digital teeth model comprising at least the 3D digital defective tooth model, the 3D digital defective tooth model resembling the tooth of the patient, the tooth of the patient being a damaged tooth missing one or more tooth sections, generate a 3D digital supplemented tooth model of the tooth of the patient, the generating of the 3D digital supplemented tooth model comprising supplementing the 3D digital defective tooth model with one or more filling tooth sections used to fill one or more of the missing tooth sections, at least one of the one or more filling tooth sections used to supplement the 3D digital defective tooth model being provided using a 3D digital artificial tooth model of an artificial tooth different from the tooth of the patient, the supplementing of the filling tooth sections further comprising:

providing the 3D digital artificial tooth model, overlaying the 3D digital defective tooth model with the 3D digital artificial tooth model, merging the 3D digital defective tooth model with the 3D digital artificial tooth model by adding at least one tooth section of the 3D digital artificial tooth model missing in the 3D digital defective tooth model as the respective at least one filling tooth section to the 3D digital defective tooth model for generating the 3D digital supplemented tooth model, wherein the merging comprises adapting the one or more filling tooth sections of the 3D digital artificial tooth model used to supplement the 3D digital defective tooth model to fit into and fill the one or more missing tooth sections of the 3D digital defective tooth model.

36. The computer device of claim 35, the tooth of the patient being a tooth to be prepared for receiving a dental restoration element, execution of the program instructions by the processor further causing the computer device to:

reduce size of the 3D digital supplemented tooth model by a pre-defined amount, the amount of the size reduction satisfying a restoration material depending minimum thickness required for a restoration material of the dental restoration element, provide an output with the reduced 3D digital supplemented tooth model defining a preparation surface of the damaged tooth for receiving a dental restoration element.

37. A manufacturing system comprising the computer device of claim 36, the manufacturing system further comprising a manufacturing device configured to manufacture the dental restoration element, execution of the program instructions by the processor further causing the computer device to control the manufacturing device to:

generate a 3D digital restoration model of the dental restoration element, the generating of the 3D digital restoration model comprising subtracting the reduced 3D digital supplemented tooth model from the 3D digital supplemented tooth model, manufacture the dental restoration element using the 3D digital restoration model as template, the manufactured dental restoration element being a physical copy of the respective template.

38. The manufacturing system of claim 37, the manufacturing device being one of the following: a machining device, a 3D printing device.

* * * * *